(12) United States Patent
Tkaczyk

(10) Patent No.: US 9,453,763 B2
(45) Date of Patent: Sep. 27, 2016

(54) TUNABLE LIGHT-GUIDE IMAGE PROCESSOR FOR MULTI-DIMENSIONAL IMAGING

(71) Applicant: Tomasz S. Tkaczyk, Houston, TX (US)

(72) Inventor: Tomasz S. Tkaczyk, Houston, TX (US)

(73) Assignee: William Marsh Rice University, Houston, TX (US)

( * ) Notice: Subject to any disclaimer, the term of this patent is extended or adjusted under 35 U.S.C. 154(b) by 0 days.

(21) Appl. No.: 14/550,597

(22) Filed: Nov. 21, 2014

(65) Prior Publication Data

US 2015/0138549 A1 May 21, 2015

Related U.S. Application Data

(60) Provisional application No. 61/907,301, filed on Nov. 21, 2013.

(51) Int. Cl.
| | |
|---|---|
| *G01J 3/28* | (2006.01) |
| *G01J 3/02* | (2006.01) |
| *H04N 5/225* | (2006.01) |
| *H04N 5/33* | (2006.01) |

(52) U.S. Cl.
CPC .......... *G01J 3/0218* (2013.01); *G01J 3/0208* (2013.01); *G01J 3/2823* (2013.01); *G01J 2003/2826* (2013.01); *H04N 5/2254* (2013.01); *H04N 5/332* (2013.01)

(58) Field of Classification Search
CPC ............ G01J 3/28; D03D 41/00; G06K 9/64
See application file for complete search history.

(56) References Cited

U.S. PATENT DOCUMENTS

| 3,786,840 A | * | 1/1974 | Courtney-Pratt | ...... D03D 11/00 139/11 |
| 2011/0285995 A1 | * | 11/2011 | Tkaczyk | ...... G01J 3/02 356/326 |

* cited by examiner

*Primary Examiner* — Tarifur Chowdhury
*Assistant Examiner* — Jamil Ahmed
(74) *Attorney, Agent, or Firm* — Osha Liang LLP

(57) ABSTRACT

A method of adjusting a resolution of a multidimensional imaging system includes taking a first hyperspectral snapshot by the multidimensional imaging system comprising a light processor comprising a plurality of optical fibers having a first end with an input spacing and a second end with an adjustable output spacing; adjusting the adjustable output spacing of the light processor to a new output spacing; and taking a second hyperspectral snapshot after adjusting the adjustable spacing of the multidimensional imagining system.

20 Claims, 24 Drawing Sheets

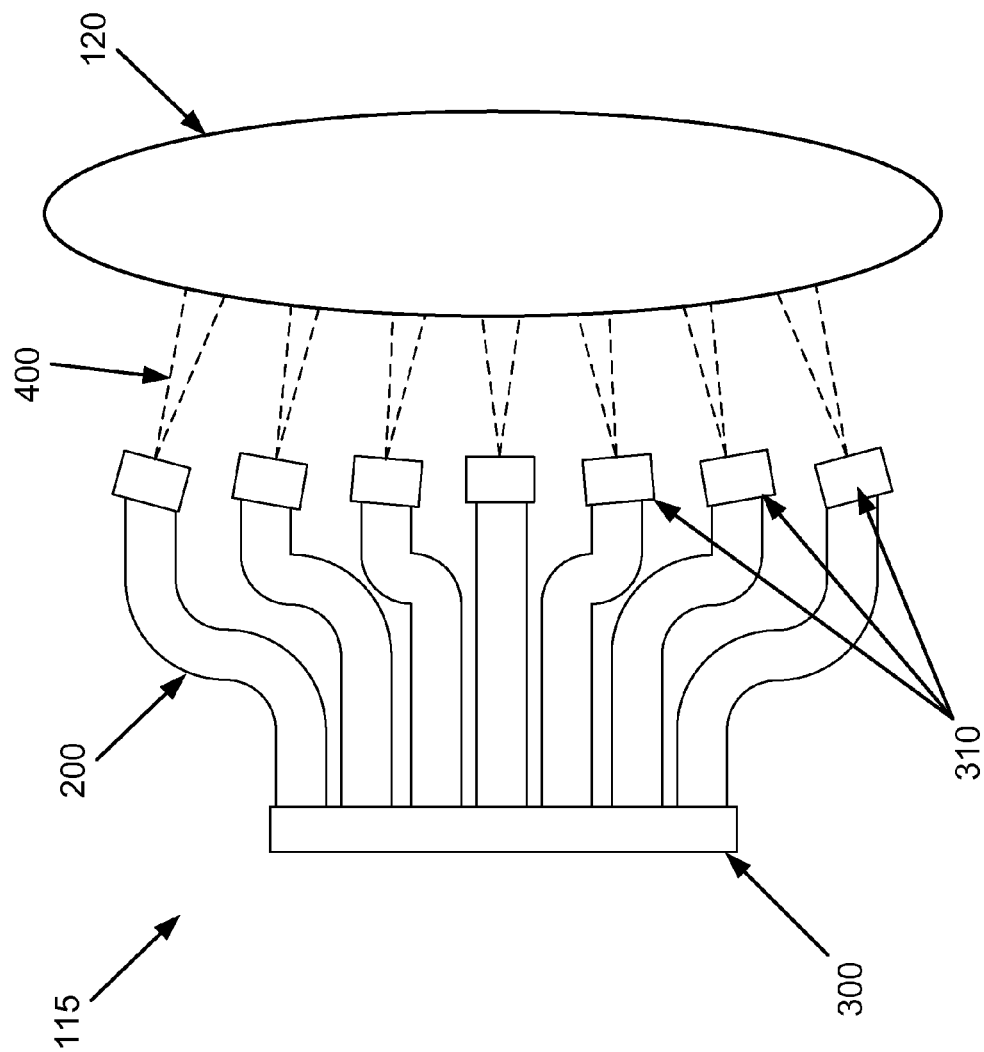

TUNABLE LIGHT-GUIDE IMAGE PROCESSOR FOR MULTI-DIMENSIONAL IMAGING

CROSS-REFERENCE TO RELATED APPLICATIONS

This application is a non-provisional patent application of U.S. Provisional Patent Application Ser. No. 61/907,301, filed on Nov. 21, 2013, and entitled: "Tunable light-guide image processor for multi-dimensional imaging." Accordingly, this non-provisional patent application claims priority to U.S. Provisional Patent Application Ser. No. 61/907,301 under 35 U.S.C. §119(e). U.S. Provisional Patent Application Ser. No. 61/907,301 is hereby incorporated in its entirety.

BACKGROUND

In general, hyperspectral imaging relates to the processing of electromagnetic radiation, such as light, to determine the spectral content of the electromagnetic radiation. Electromagnetic radiation may include energy distributed over a wide band of frequencies.

SUMMARY

In one aspect, a method of adjusting a resolution of a multidimensional imaging system according to one or more embodiments may include taking a first hyperspectral snapshot by the multidimensional imaging system comprising a light processor comprising a plurality of optical fibers having a first end with an input spacing and a second end with an adjustable output spacing; adjusting the adjustable output spacing of the light processor to a new output spacing; and taking a second hyperspectral snapshot after adjusting the adjustable spacing of the multidimensional imagining system.

In one aspect, a multidimensional imaging system according to one or more embodiments may include a light processor comprising a plurality of optical fibers having a first end with an input spacing and a second end with an adjustable output spacing; and a spectral separator having an adjustable spread distance and configured to generate a plurality of spread spectrum spots. The output spacing is different than the input spacing. An input electromagnetic radiation is received by the first end of each of the optical fibers of the plurality of optical fibers. An output electromagnetic radiation is provided by the second end of each optical fiber of the plurality of optical fibers to a corresponding spread spectrum spot of the plurality of spread spectrum spots.

BRIEF DESCRIPTION OF DRAWINGS

Certain embodiments of the disclosure will be described with reference to the accompanying drawings. However, the accompanying drawings illustrate only certain aspects or implementations of the disclosure by way of example and are not meant to limit the scope of the claims.

FIGS. 4A-4C show a light processor in accordance with one or more embodiments of the disclosure.

DETAILED DESCRIPTION

Figure 1:
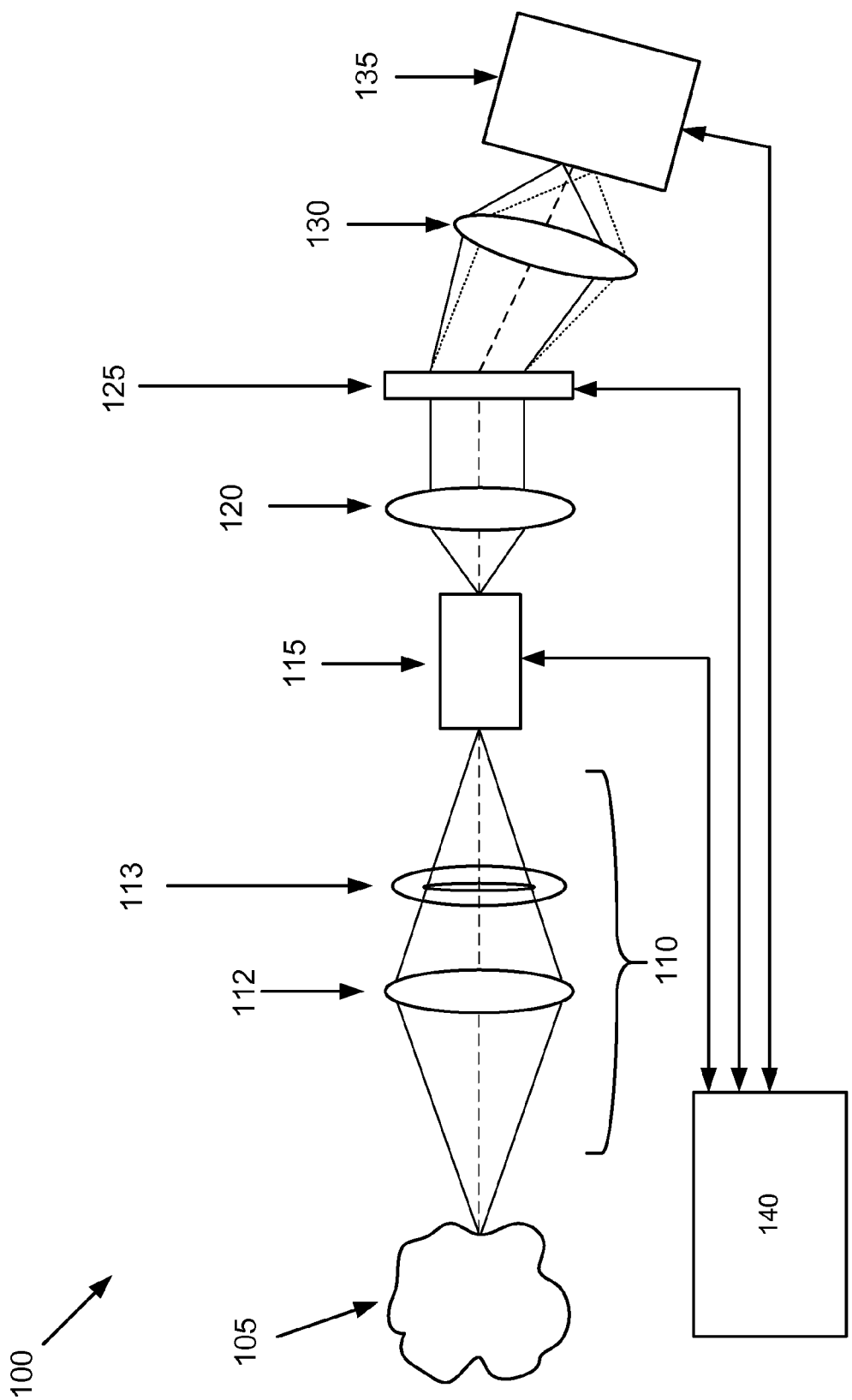
FIG. 1 shows a multidimensional imaging system in accordance with one or more embodiments of the disclosure.

Specific embodiments will now be described with reference to the accompanying figures. In the following description, numerous details are set forth as examples of the invention. It will be understood by those skilled in the art that one or more embodiments of the present disclosure may be practiced without these specific details and that numerous variations or modifications may be possible without departing from the scope of the invention. Certain details known to those of ordinary skill in the art are omitted to avoid obscuring the description.

A hyperspectral snapshot is a spatial and spectral mapping of electromagnetic radiation generated at a single point in time. For example, electromagnetic radiation may be received within a fixed view window. The fixed view window may be divided into a number of portions and the spectral content of each portion may be determined. A hyperspectral snapshot is the spectral content of the aforementioned portions. Said another way, a hyperspectral snapshot may include a number of spatial portions and spectral information associated with each portion.

Embodiments of the disclosure include multidimensional imaging systems, devices, and methods. In one or more embodiments of the disclosure, the multidimensional imaging may be hyperspectral imaging. In one or more embodiments of the disclosure, the hyperspectral imaging may be hyperspectral snapshot imaging.

In one or more embodiments of the disclosure, a multidimensional imaging system may receive electromagnetic radiation that has previously interacted with a target. For example, the electromagnetic radiation may be light reflected from a target. In another example, the electromagnetic radiation may be light transmitted through a target. In an additional example, the electromagnetic radiation may be light generated by a target such as light generated by a light bulb, flame, or other source. The electromagnetic radiation may be provided by a source, such as a light, or may be ambient electromagnetic radiation, such as light. The multidimensional imaging system may spatially divide the received electromagnetic radiation into a number of portions and determine the spectral content of each portion of the divided electromagnetic radiation.

In one or more embodiments of the disclosure, the multidimensional imaging system may dynamically adjust a spatial resolution, e.g. the number of portions into which the received electromagnetic radiation is divided. For example, a multidimensional imaging system may receive electromagnetic radiation and divided the electromagnetic radiation into 64 portions, e.g. an array of 8 portions by 8 portions. The multidimensional imaging system may change the number of portions into which the received electromagnetic radiation is divided, e.g. changing from an array of 8 portions by 8 portions to an array of 8 portions by 12 portions.

In one or more embodiments of the disclosure, the multidimensional imaging system may dynamically adjust a spectral resolution, e.g. the number of bins into which the spectral content of each portions of the received electromagnetic radiation is divided. The multidimensional imaging system may determine the spectrum of a portion of the received electromagnetic radiation by dividing the spectrum into discrete ranges. For example, the multidimensional imaging system may divide the spectrum of the received electromagnetic radiation into 5 ranges such as 400-450 THz, 450-500 THz, 550-600 THz, 600-650 THz, and 650-700 THz. The multidimensional imaging system may change the number of discrete ranges dynamically. For example, from 5 to 8, e.g. changing the ranges to 400-440 THz, 440-480 THz, 520-560 THz, 560-600 THz, 600-640 THz, 640-680 THz, 680-720 THz, and 720-760 THz. The aforementioned example spectrum divisions are merely examples of how spectrum could be divided and embodiments of the disclosure are not limited to the aforementioned examples. Any spectrum division may be used without departing from the scope of the disclosure. Additionally, while the aforementioned example spectrum divisions have been described with respect to frequency range, the spectrum divisions may also be described by corresponding wavelengths of electromagnetic radiation associated with spectrum divisions as would be known to one of ordinary skill in the art. For example, visible light has a corresponding wavelengths in the range of approximately 380 nm to 740 nm. The spectral range may divided into four discrete ranges of, for example, 380 nm-470 nm, 471 nm-560 nm, 561 nm-650 nm, and 651 nm-740 nm. Thus, the spectrum division may be described with respect to the frequency or the wavelength of the electromagnetic radiation as would be known to one of ordinary skill in the art.

Thus, embodiments of the disclosure may enable a multidimensional imaging system to adjust the spatial and spectral resolution of hyperspectral snapshots dynamically.

FIG. 1 shows an optical pipeline diagram of a multidimensional imaging system (100) in accordance with one or more embodiments of the disclosure. The multidimensional imaging system (100) may receive electromagnetic radiation, which has interacted with a target (105), and generate a hyperspectral snapshot of the target (105). The multidimensional imaging system (100) may include a front end (110), a light processor (115), a spectral separator (125), and an image sensor (135).

The front end (105) may limit the quantity of received electromagnetic radiation, spatially filter the received electromagnetic radiation, and focus the received electromagnetic radiation to form a real imagine on the input of a light processor (115), e.g. the focal plane of the front end (110) corresponds to the input of the light processor (115). The front end (110) may include a first lens (112) and a first iris (113) and other components (not shown) as would be known to one of ordinary skill in the art to process the electromagnetic radiation to form a real image at the input of the light processor (115). An iris, as known in the art, is an opaque optical component that includes a small aperture that may be used to limit light passage. A lens, as known in the art, is an optical device that focuses light.

The light processor (115), described in greater detail below and shown in FIGS. 2-6, may receive the projected real image and subdivide the real image into a number of portions corresponding to spatial portions of the real image. Each portion may be output, as a number of optical outputs, by the light processor. The optical outputs may be in a different spatial arrangement than the real image. Each optical output may be collected by a second lens (120). The second lens (120) may collimate the received optical outputs and direct the collimated optical outputs to the spectral separator (125).

The spectral separator (125), described in detail below and shown in FIGS. 7A-7E, may receive the collimated optical outputs and generate a spread spectrum spot corresponding to each portion of the number of portions. In one or more embodiments of the disclosure, the spectral separator (125) may be a prism, a diffractive grating, or any other component that spatially distributes a spectrum of incident electromagnetic radiation. Each spread spectrum spot is a spatial distribution of the spectral content corresponding to one of the optical outputs, e.g. a diffraction or refraction spectrum. The spectral separator may direct each spread spectrum spot onto a third lens (130). The third lens (130) may project each spread spectrum spot onto an image sensor (135). Projecting each spread spectrum spot may focus each spread spectrum spot on a portion of the image sensor (135).

The image sensor (135) may include a number of light sensing elements, e.g. pixels, which generate electrical signals in response to receiving electromagnetic radiation. The light sensing elements may be distributed spatially over a surface. The image sensor (135) may receive each spread spectrum spot across a number of light sensing elements. By receiving the spread spectrum spot across a number of light sensing elements, the image sensor (135) may generate electrical signals corresponding to the spectral content of each spread spectrum spot. By determine the spectral content of each spread spectrum spot, the spectral content of each optical output may generated by the light processor (115) may be determined.

The multidimensional imaging system (100) may include a controller (140). The controller (140) communicates with and controls the operations of the light processor (115), the spectral separator (125), and the image sensor (135). The controller is configured to direct the operations of the aforementioned system components to generate a hyperspectral snapshot. The controller (140) may include a processor and computer instructions stored on a non-transitory computer readable media.

The controller (140) may include a communication interface (not shown) to communicate with other components of the multidimensional imaging system (100). The controller (140) may send and receive messages by the communication interface.

In one or more embodiments of the disclosure, the controller (140) may include a number of hyperspectral maps, described in detail below, that may be used to determine a hyperspectral snapshot based on the electrical signals generated by the image sensor (135). The controller (140) may receive the electrical signals generated by the image sensor (135) and generate a hyperspectral snapshot based on one of the hyperspectral maps. The controller (140) may select a hyperspectral map based on a configuration of the light processor (115) and spectral separator (125).

Figure 2:
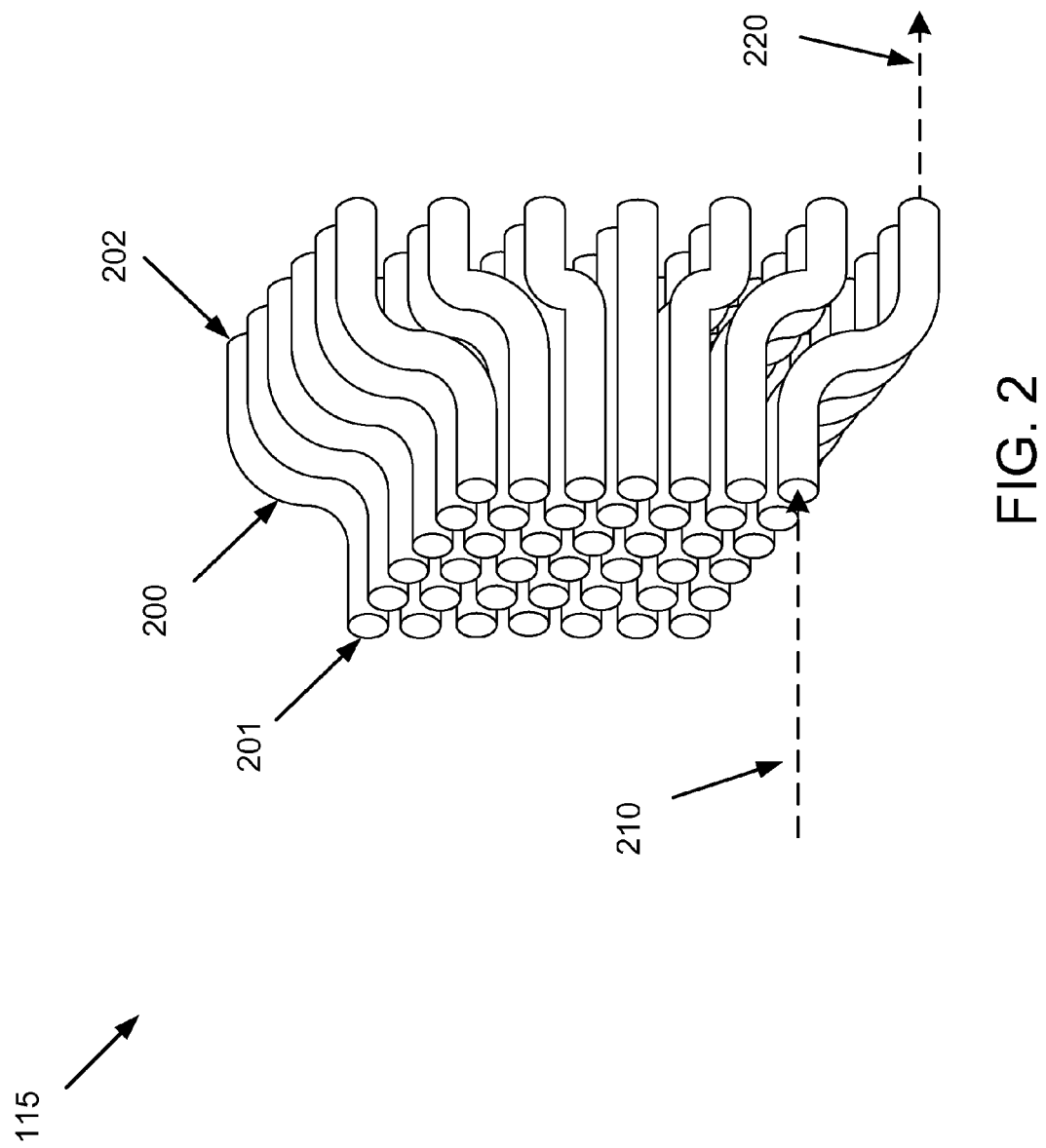
FIG. 2 shows a light processor in accordance with one or more embodiments of the disclosure.

FIG. 2 shows a light processor (115) in accordance with one or more embodiments of the disclosure. As discussed above, the light processor (115) receives the real image and subdivides the real image into a number of portions. The light processor (115) includes a number of optical fibers (200). Each optical fiber of the optical fibers (200) includes a first end (201) and a second end (202). Each first end (201) of the optical fibers (200) receives a portion of the real image and each second end (202) of the optical fibers (200) outputs the portion of the real image received by the first end (201). Each outputted portion of the real image is an optical output. A portion of the real image may be projected onto the first end (201) of each optical fiber (200) by the front end (110, FIG. 1). An optical output may be generated by the second end (202) of each of the optical fibers (200).

For example, input light (210) corresponding to a portion of the real image may enter a first end (201) of an optical fiber. The input light (210) may traverse the optical fiber and exit the second end (202) as output light (220). The output light (220), generated by a second end (202) in response a first end (201) receiving a portion of a real image is an optical output. Thus, the light processor (115) may generate a number of optical outputs corresponding to the number of optical fibers and each optical output may include light corresponding to a portion of the real image.

FIG. 3 shows a light processor (115) in accordance with one or more embodiments of the disclosure. The light processor (115) may include an input harness (300) that positions each first end (201) of the optical fibers (200) to receive portions of the real image. In one or more embodiments of the disclosure, the input harness (300) may position each first end (201) in a periodic grid having an input spacing (301). For example, each first end (201) may be positioned in a square grid and separated from each neighboring first end (201) by the input spacing (301). FIG. 3B shows an example of a uniform grid of first ends (201), labeled as A1-A18, with an input spacing (301). By positioning each optical fiber in a grid, the real image received from the front end (110) may be subdivided into a number of portions.

In one or more embodiments of the disclosure, the input harness (300) may position each first end (201) in a non-periodic grid. FIG. 3C shows an example of a non-uniform grid of first ends (201), labeled as A1-A18. As seen from FIG. 3C, the spacing between each first end (201) varies depending on location. For example, the horizontal spacing between A1 and A2 is larger than the horizontal spacing between A5 and A6. In another example, the vertical spacing between A1 and A7 is greater than the vertical spacing between A9 and A3. Additionally, as seen from FIG. 3C, the first ends (201) do not correspond to a row and column structure. Thus, embodiments of the disclosure include an input harness with any arrangement of first ends (201). By arranging the first ends (201) in a non-uniform grid, embodiments of the disclosure may enable a hyperspectral snapshot to be captured that includes a greater spatial resolution in a critical area of a hyperspectral snapshot. For example, a hyperspectral snapshot of a biological structure, such as a cell, may include a critical area, such as a cell wall. By placing the first ends (201) in a non-uniform grid, a hyperspectral snapshot of a cell may include greater spatial resolution near the cell wall.

The light processor (115) may include a number of output harnesses (310). Each output harness may position the second end (202) of each optical fiber of a portion of the optical fibers (200). By positioning each second end (202) of each optical fiber, a number of optical outputs corresponding each first end (201) may be generated that are in a different spatial arrangement than the first ends (201).

Figure 3A:
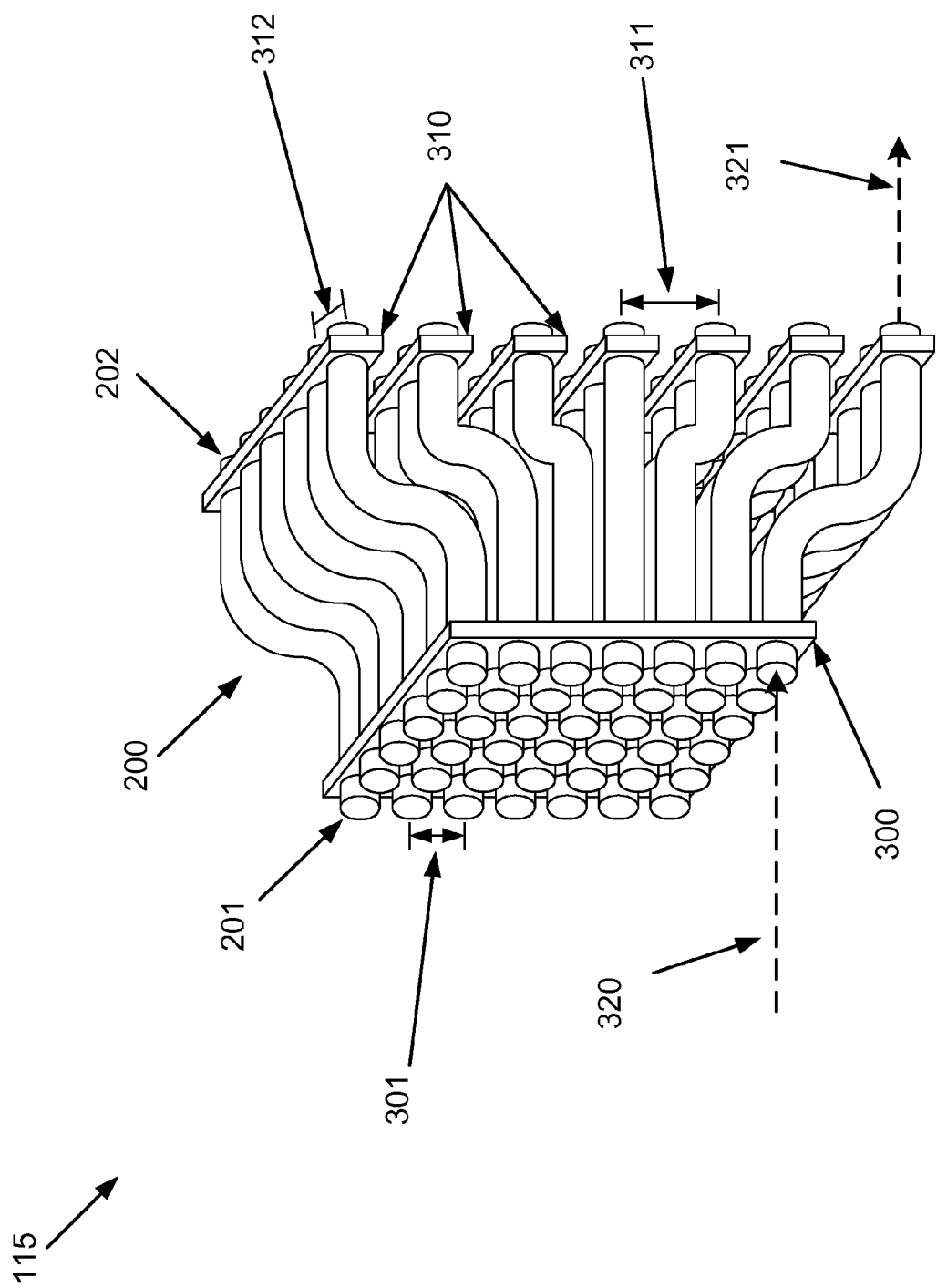
FIG. 3A-3D shows a light processor in accordance with one or more embodiments of the disclosure.
Figure 3B:
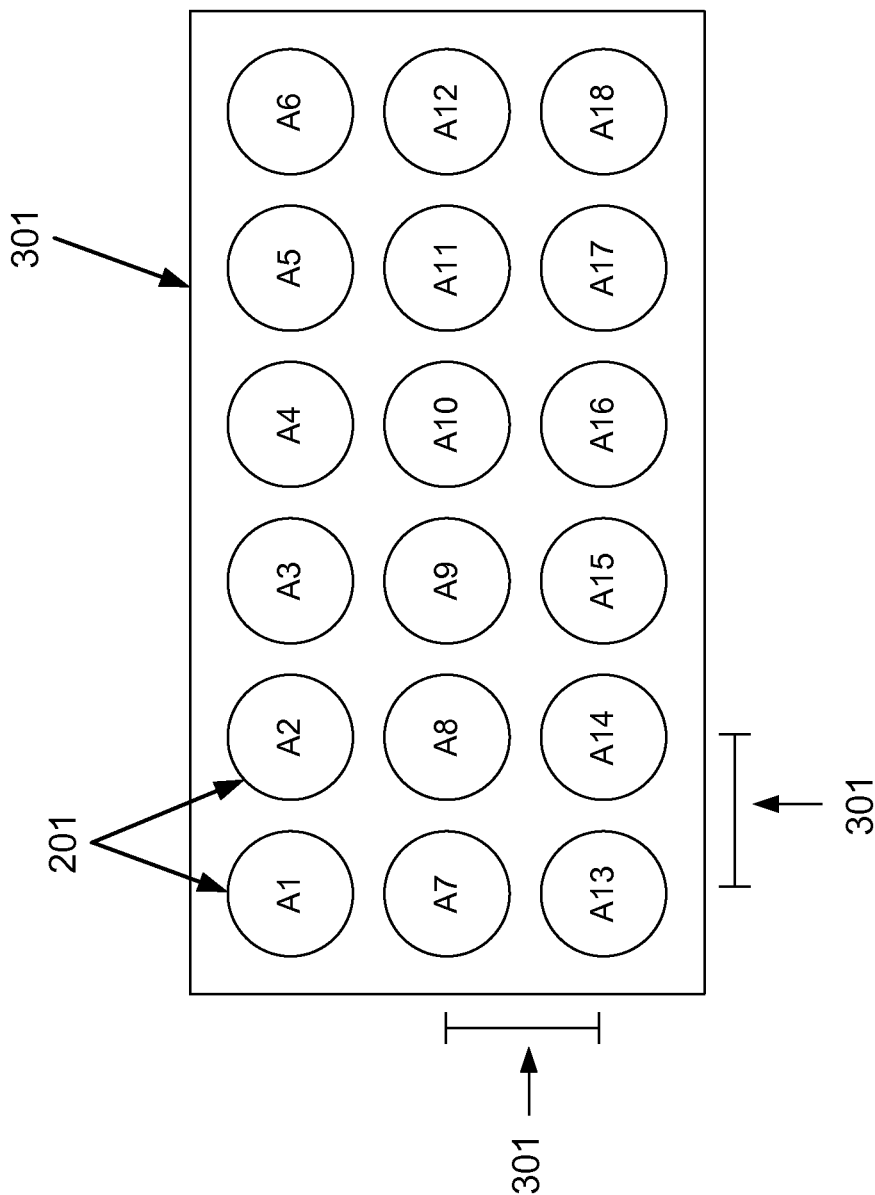
Figure 3C:
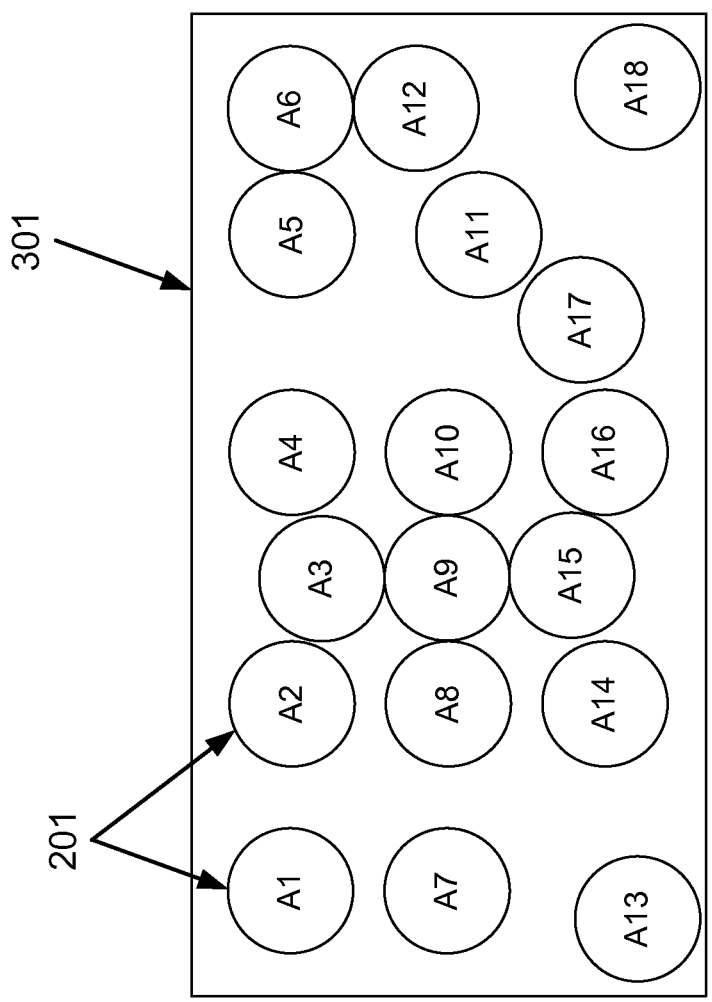
Figure 3D:
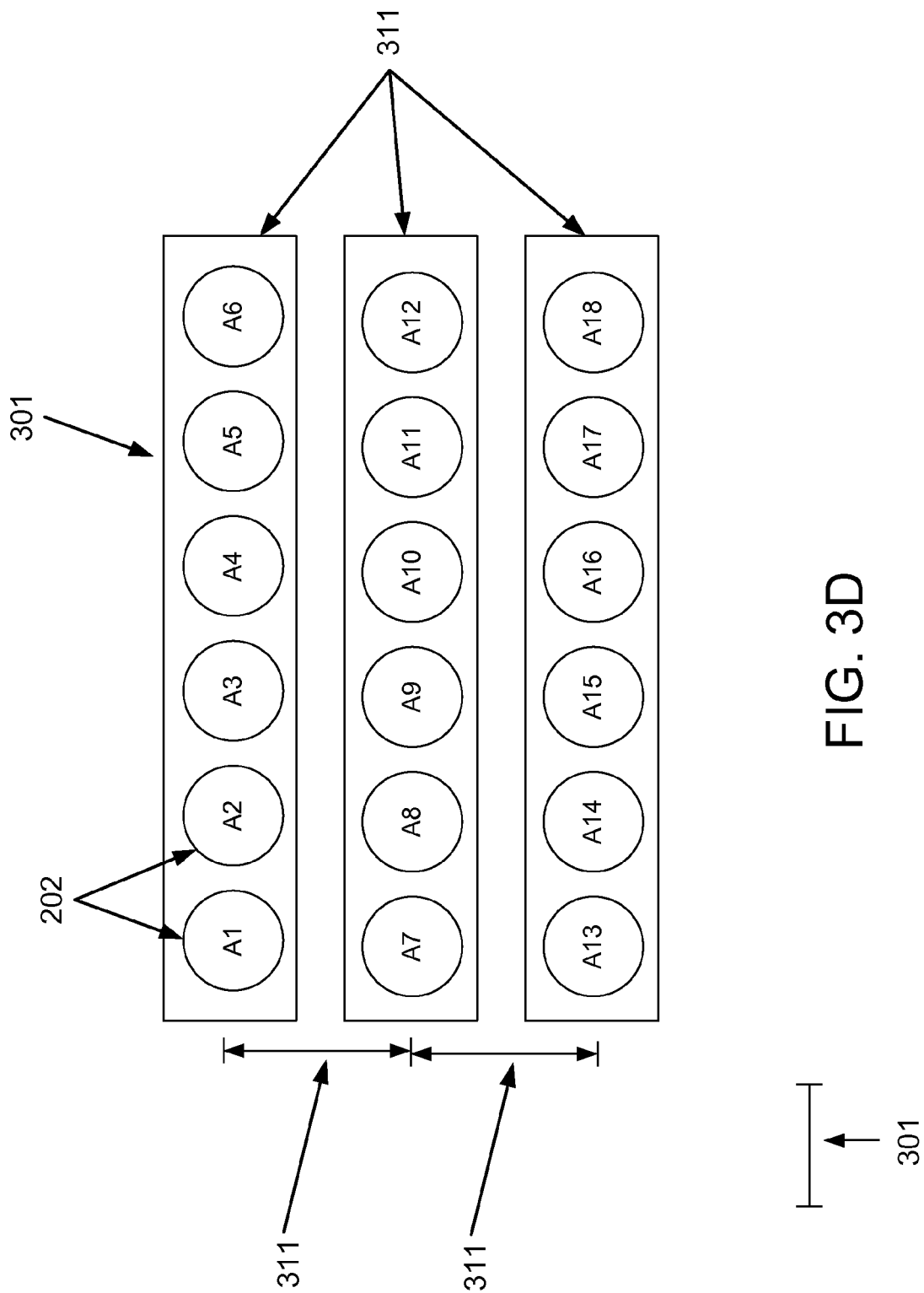

For example, FIG. 3D shows second ends (202) of each optical fiber arranged into portions and positioned by output harnesses (311). Each second end (202) of each optical fiber is labeled as A1-A18. As seen from FIG. 3D, each output harness is separated from each other output harness by an output spacing 311. Thus, if each labeled first end (201) shown in FIG. 3B or FIG. C is connected to a correspondingly labeled second end (202) shown in FIG. 3D, the optical outputs generated by the second ends (202) are in a different spatial arrangement than the first ends (201).

With reference to FIG. 3A, in one or more embodiments of the disclosure, each second end (202) of each optical fiber of the portion of the optical fibers (200) may be in a periodic grid having a output harness spacing (312) and an output spacing (311). For example, each second end (202) of each optical fiber of the portion of the optical fibers (200) may be positioned in a grid and separated from each neighboring second end (202) of each optical fiber by the output harness spacing (312) in a first dimension and an output spacing (311) in a second dimension.

In one or more embodiments of the disclosure, the output spacing (311) is different than the output harness spacing (312). In one or more embodiments of the disclosure, the output harness spacing (312) is different than the input spacing (301). While the output harness (310) has been drawn to include a 1 by 6 grid, the output harnesses (310) may be a 2 by 7 grids, 3 by 7 grids, etc. without departing from the scope of the disclosure.

If an output harness includes a grid of second ends (202) including more than one second end (202) in each dimension, e.g. a 2 by 7 grid, each second end (202) of each optical fiber of the portion of the optical fibers (200) may be in a periodic grid having an output harness spacing (312) in both dimensions. Each output harness of the number of output harnesses (310) may be separated by an output spacing (311). Thus, each second end (202) of a portion of the second ends (202) may be in a uniform grid having an output harness spacing (312) and each portion of the second ends (202) may be separated from each other portion of the second ends (202) by the output spacing (311).

In one or more embodiments of the disclosure, the output spacing (311) is dynamically adjustable. By adjusting the output spacing (311), the spectral resolution of the multidimensional imaging system (100) may be changed, as discussed in detail below.

In one or more embodiments of the disclosure, the position of each second end (202) may be dynamically adjustable. For example, each send end (202) may held by a corresponding output harness (310) that may be positioned dynamically and independently of any other output harness (310). By adjusting the position of each output harness (310), the position of each send end (202) may be adjusted and therein the position of each second end (202) may not conform to any type of grid or particular arrangement. Thus, the spatial and spectral resolution of the multidimensional imaging system (100) may be adjusted, as discussed in detail below.

Figure 4A:
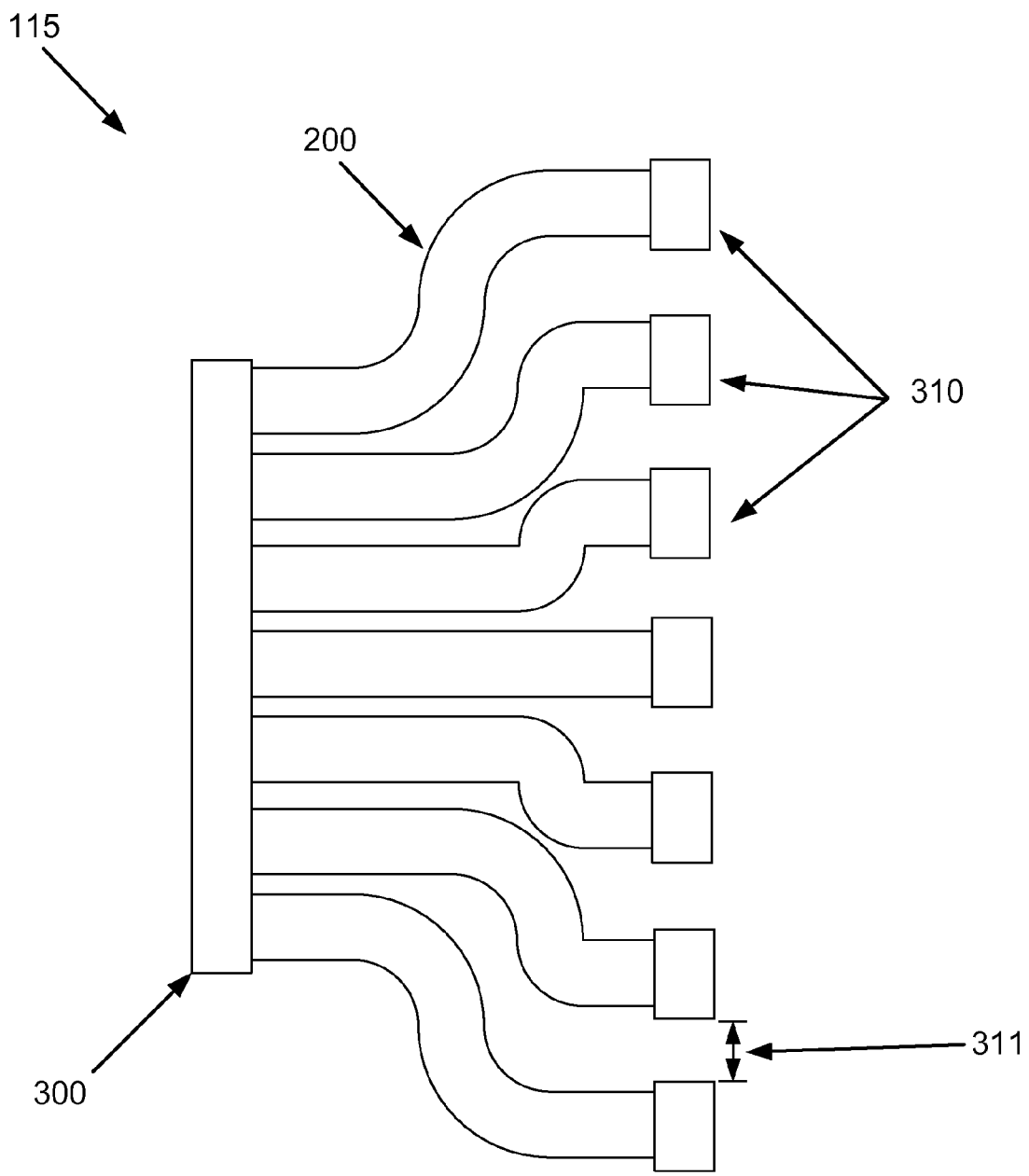
Figure 4B:
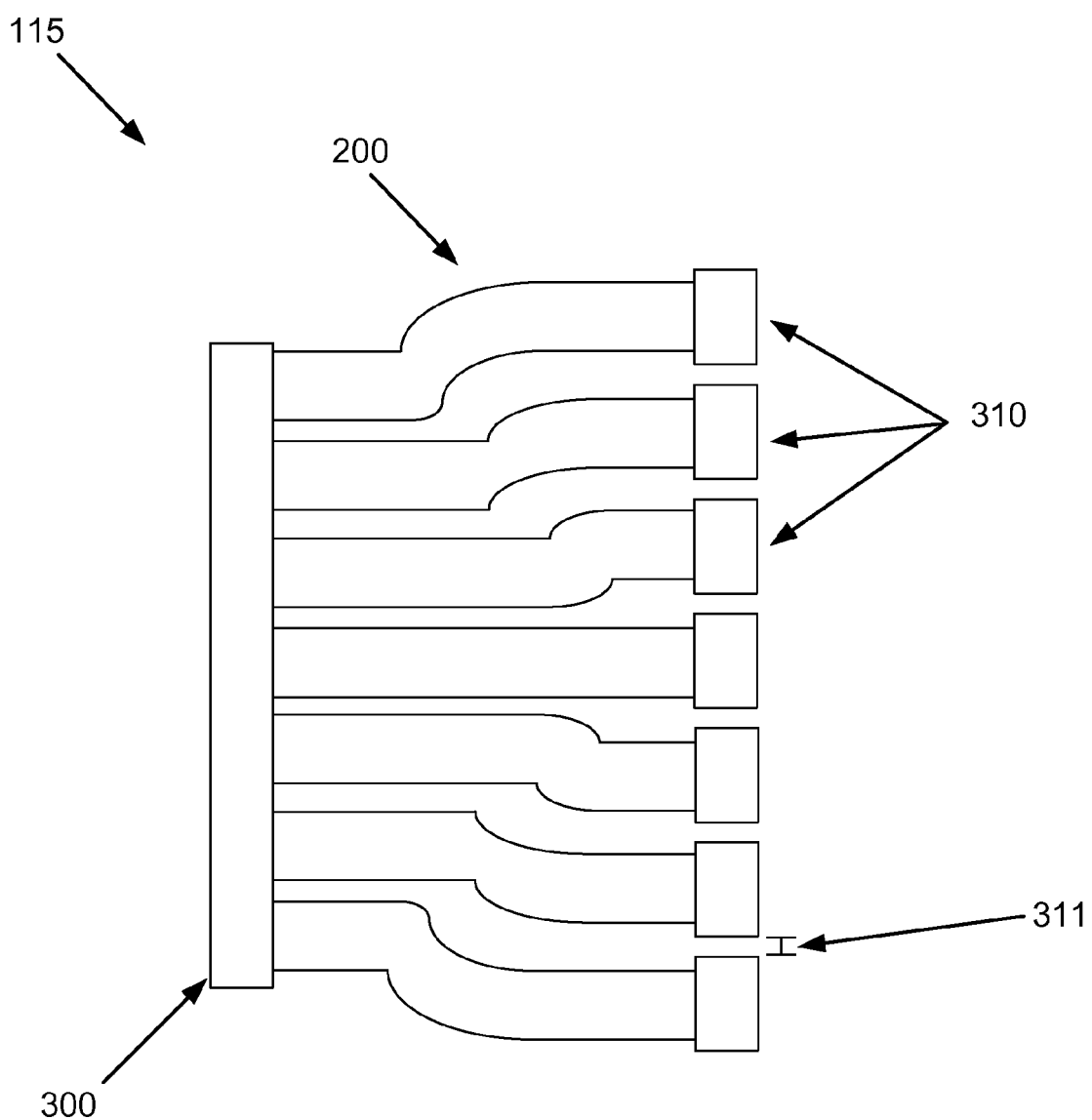

FIG. 4A shows a side view of the light processor (115) having an output spacing (311). In one or more embodiments of the disclosure, the output spacing (311) may be adjusted. For example, the output spacing (311) may be reduced. FIG. 4B shows an example of a light processor (115) having a reduced second spacing (311).

FIG. 4C shows a light processor (115) in accordance with one or more embodiments of the disclosure. Specifically, FIG. 4C shows a light processor (115) including output harnesses (310) that are angled to match the curvature of the second lens (120). By angling the output harnesses (310), each second end (not shown) of each fiber of the optical fibers (200) may direct output light (400) towards the second lens (120).

As discussed above, the output spacing (311) of the output harnesses (310) may be dynamically adjusted. FIGS. 5A-5D illustrate mechanisms for adjusting the output spacing (311) in accordance with one or more embodiments of the disclosure.

Figure 5A:
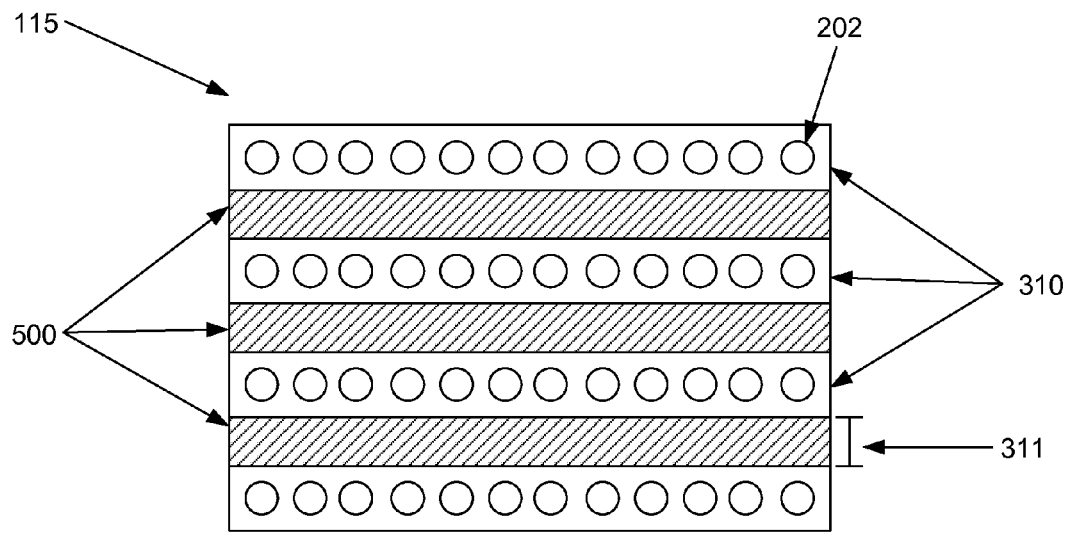
FIGS. 5A-5D show an output of a light processor in accordance with one or more embodiments of the disclosure.

FIG. 5A shows a diagram of the output side of the light processor (115) in accordance with one or more embodiments of the disclosure. The light processor (115) may include layers of a compressible material (500), such as foam, elastomer, or any other compressible material, disposed between each of the output harnesses (310). By applying a compressive force to the light processor (115), the output spacing (311) may be changed.

Figure 5B:
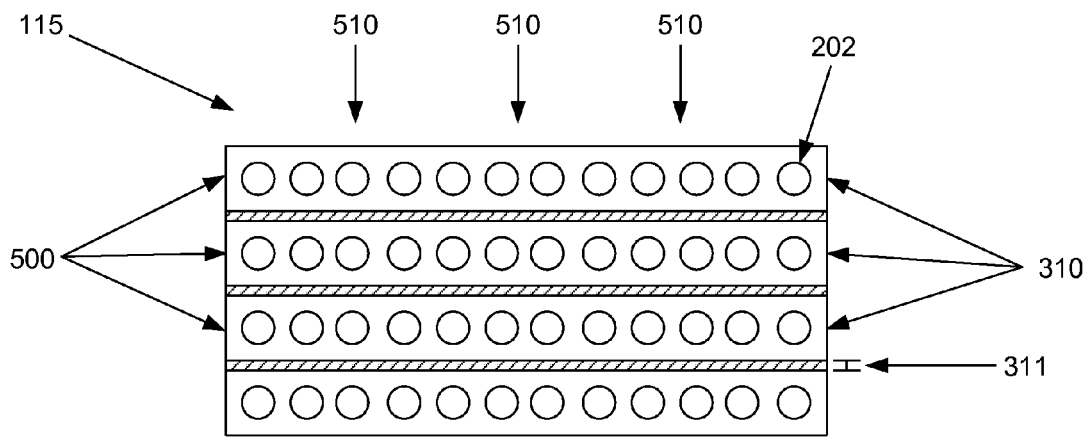

FIG. 5B shows a diagram of the output side of the light processor (115) after a compressive force (510) is applied. As seen from FIG. 5B, the compressible material (500) compressed in response to the applied compressive force (510). By compressing the compressible material (500), the output spacing (311) changed to a smaller value when compared to FIG. 5A. Thus, applying compressive force (510) to the light processor (115) may change the output spacing (311). Similarly, reducing the applied compressive force (510) may increase the output spacing (311).

Figure 5C:
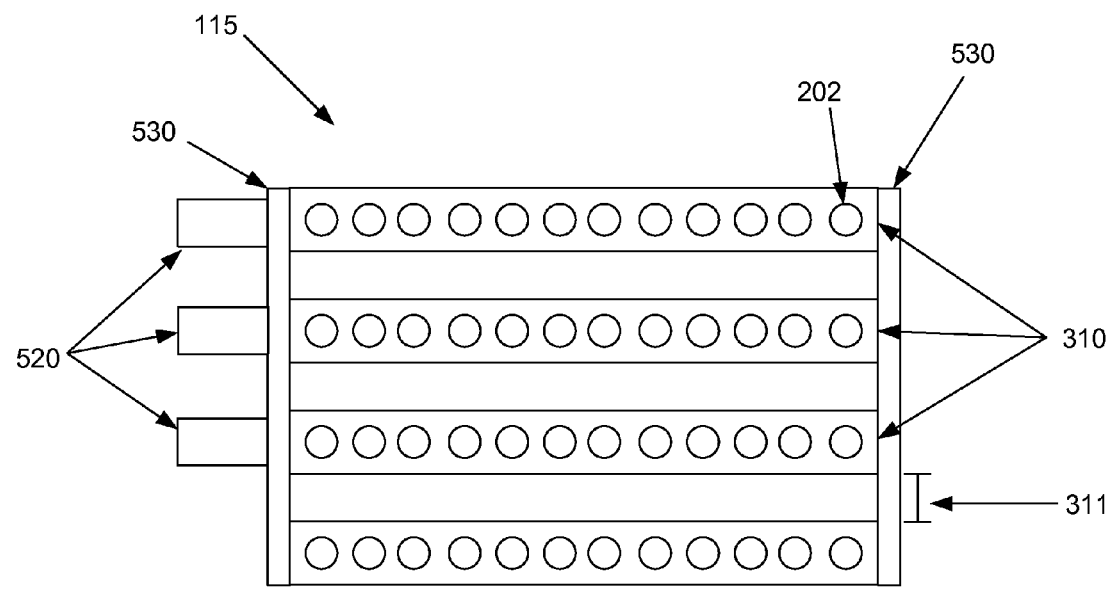

FIG. 5C shows a diagram of the output side of the light processor (115) in accordance with one or more embodiments of the disclosure. The light processor (115) may include rails (530) onto which the output harnesses (310) are mounted. Each output harness may include a motor (520). Each motor (520) may independently drive each output harness along the rails (530). Thus, the output spacing (311) of the output harnesses (310) may be adjusted by driving the motors (520).

Figure 5D:
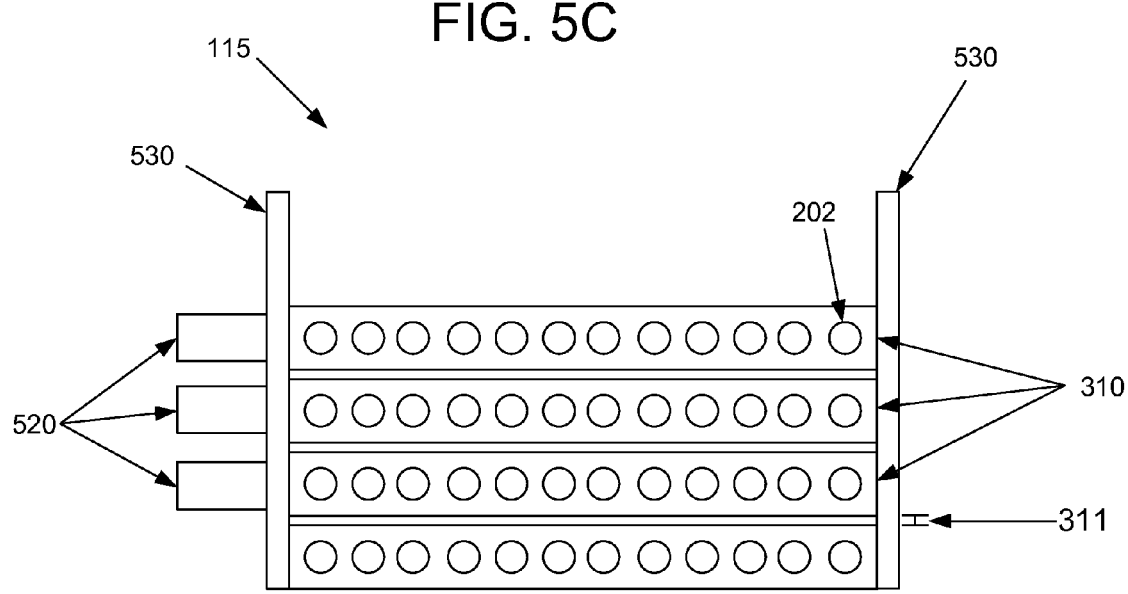

FIG. 5D shows an example of driving the motors (520) along the rails (530). As seen from FIG. 5D, the output spacing (311) of the output harnesses (310) was changed by driving the motors (520).

While FIGS. 5C and 5D illustrate that in one or more embodiments of the disclosure the output spacing (311) may be adjusted by the use of motors and rails, embodiments of the disclosure are not limited to these mechanisms. Any mechanism may be used to position the output harnesses (310) to adjust the output spacing (311) as would be known to one of ordinary skill in the art without departing from the scope of the disclosure.

Figure 6:
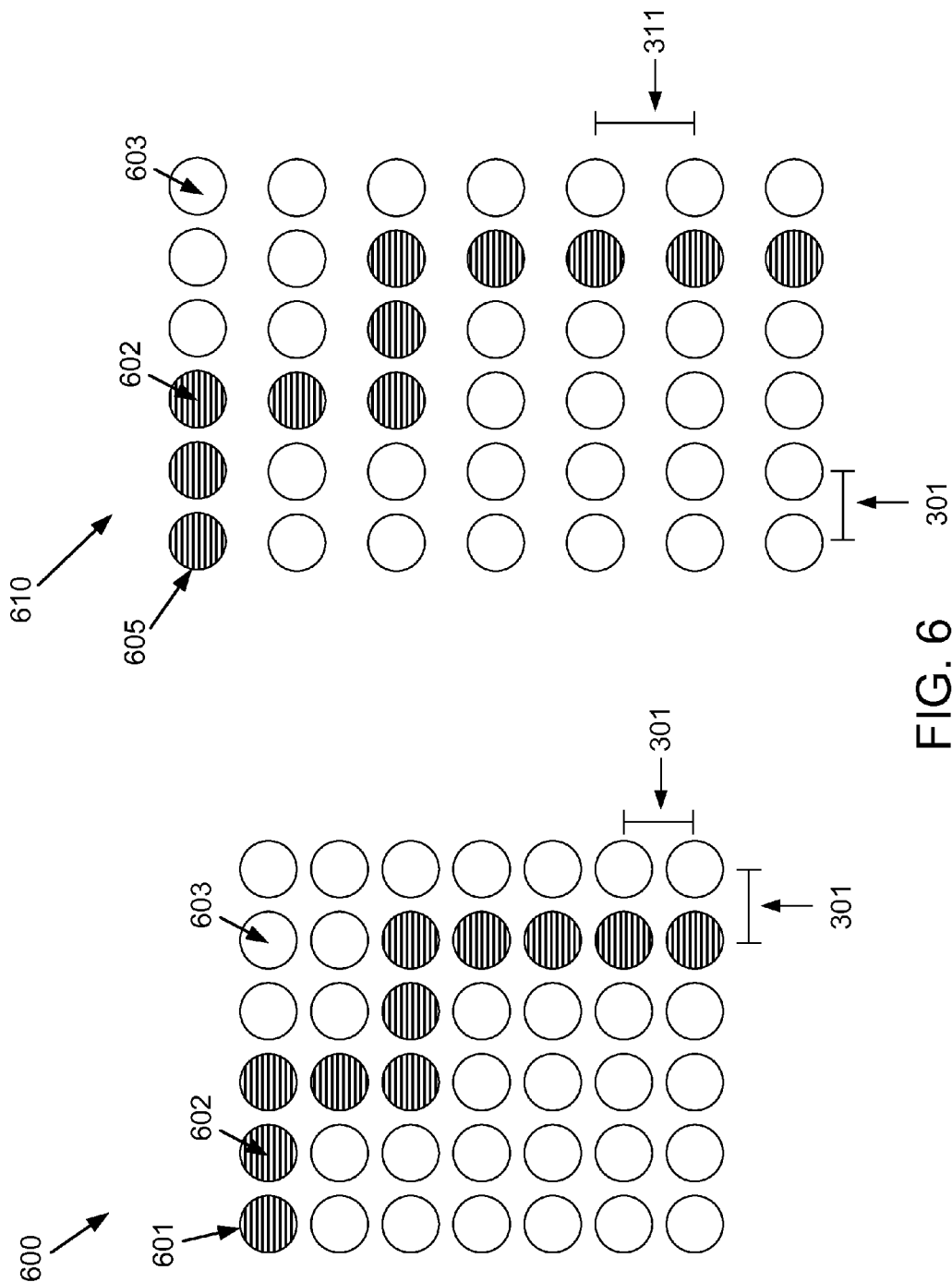
FIG. 6 show an input and output of a light processor in accordance with one or more embodiments of the disclosure.

To further clarify the relationship between the real image received by the light processor (115, FIG. 1) and the optical outputs generated by the light processor (115, FIG. 1), FIG. 6 shows an example of light received (600) by each first end (201) of the optical fibers (200) of the light processor (115) and light output (610) as optical outputs by the light processor (115) in response to receiving a real image in accordance with one or more embodiments of the disclosure. Specifically, FIG. 6 shows the first end (601) of each optical fiber. Each first end (601) of each optical fiber indicates that it is receiving electromagnetic radiation having a first color spectrum (602) or receiving electromagnetic radiation having a second color spectrum (603). FIG. 6 also shows the light output (610) of the second end (605) of the optical fibers (200). Each second end (605) indicates that the second end (605) is outputting electromagnetic radiation having a color spectrum corresponding to the color spectrum received by the first end (601).

As described above, the second ends (605) of the optical fibers (200, FIG. 2) are divided into portions housed in output harnesses (not shown). Each second end (605) housed in each output harness is separated from each other second end (605) housed in the output harness by the input spacing (301). Each output harness is separated from each output harness by the output spacing (311). Thus, the light output (610) is divided into groups separated by the output spacing (311) where each group is a portion of the second ends (605) in a uniform array having an input spacing (301). As seen from FIG. 6, each group is illustrated as 1×6 array of second ends (605) having a uniform spacing of the input spacing (301) and each group is separated from each other group by the output spacing (311). However, embodiments of the disclosure are not limited to the grouping arrangement as shown in FIG. 6. Each group could be any type of array, for example a 2×5 array of second ends (605), a 3×10 array of second ends (605), or any other array of second ends, without departing from the scope of the disclosure. Accordingly, each second end (605) of the optical fibers (200) is separated from each other second end in a first dimension by the input spacing (301). In FIG. 6, the first dimension is left to right across the page. The second ends (605) are divided into portions by the output harnesses (not shown) and each portion is separated from each other portion by the second spacing (311) in a second dimension. In FIG. 6, the second dimension is top to bottom across the page Thus, as seen from FIGS. 5A-5D and 6, the light processor (115) may receive an input real image, subdivide the real image into a number of portions, and generate optical outputs with a second spacing (311) that is adjustable. Each generated optical output may be projected onto the spectral separator (125, FIG. 1).

Figure 7A:
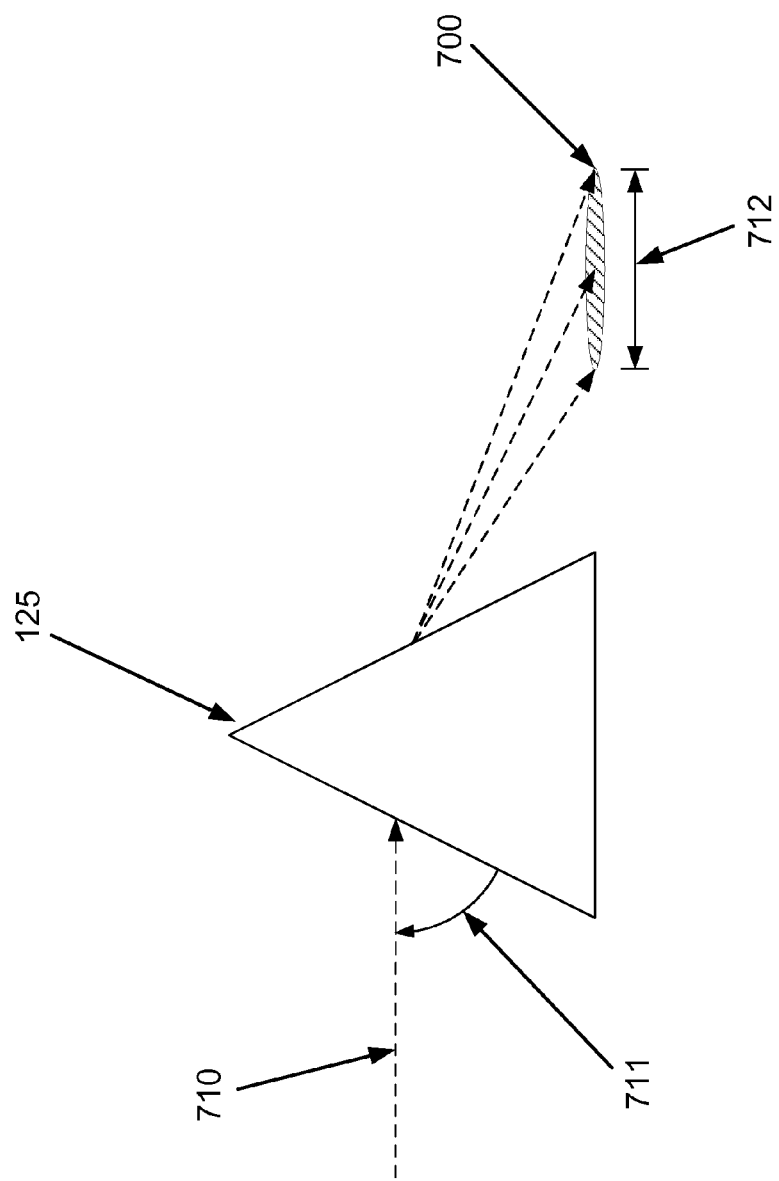
FIGS. 7A-7E show a spectral separator in accordance with one or more embodiments of the disclosure.

FIG. 7A shows a spectral separator (125) in accordance with one or more embodiments of the disclosure. Specifically, FIG. 7A shows a prism as an example of a spectral separator (125). The spectral separator (125) may receive the optical outputs from the light processor (115) by the second lens (120). The spectral separator (125) may generate a spread spectrum spot (700) corresponding to a received optical output.

For example, the spectral separator (125) may receive an optical output (710) having an angle of incidence (711) with respect to the spectral separator (125). The spectral separator (125) may generate a spread spectrum spot (700) corresponding to the optical output (710) in response to receiving the optical output (710). In the case of a prism, the spectral separator (125) generates the spread spectrum spot by refraction. The generated spread spectrum spot (700) has a spread distance (712) corresponding to the angle of incidence (711) associated with the received optical output (710). The spectral content of the optical output (710) is dispersed over the spread distance (712). In other words, the spectral content of the optical output (710) is mapped from the spectral domain to a spatial domain corresponding to the spread distance (712).

Figure 7B:
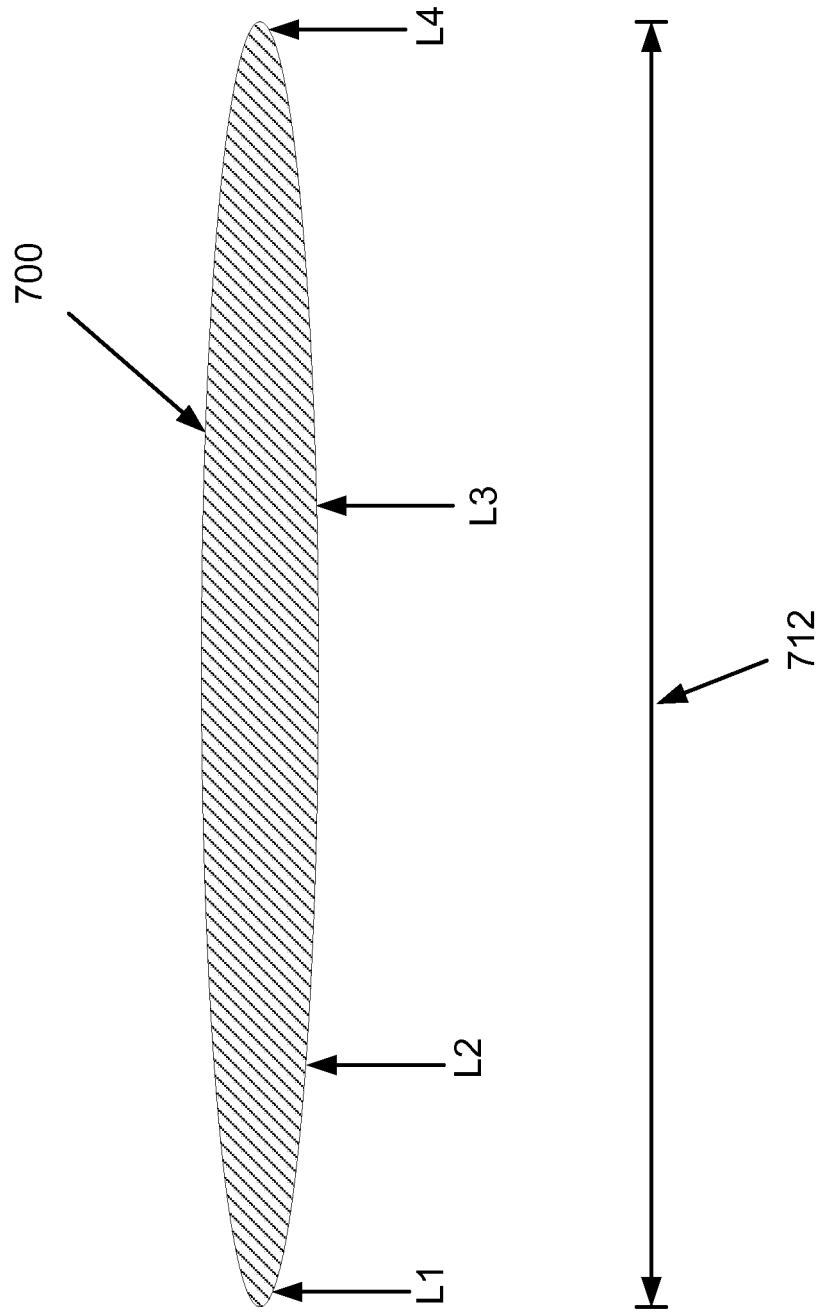

FIG. 7B shows an enlarged view of a spread spectrum spot (700) having a spread distance (712). The spectral content of the optical output (710) is dispersed along the length of the spread distance (712). Thus, the spread spectrum spot (700) has a spatially distributed spectral content that corresponds to the spectral content of the optical output (710).

Figure 7C:
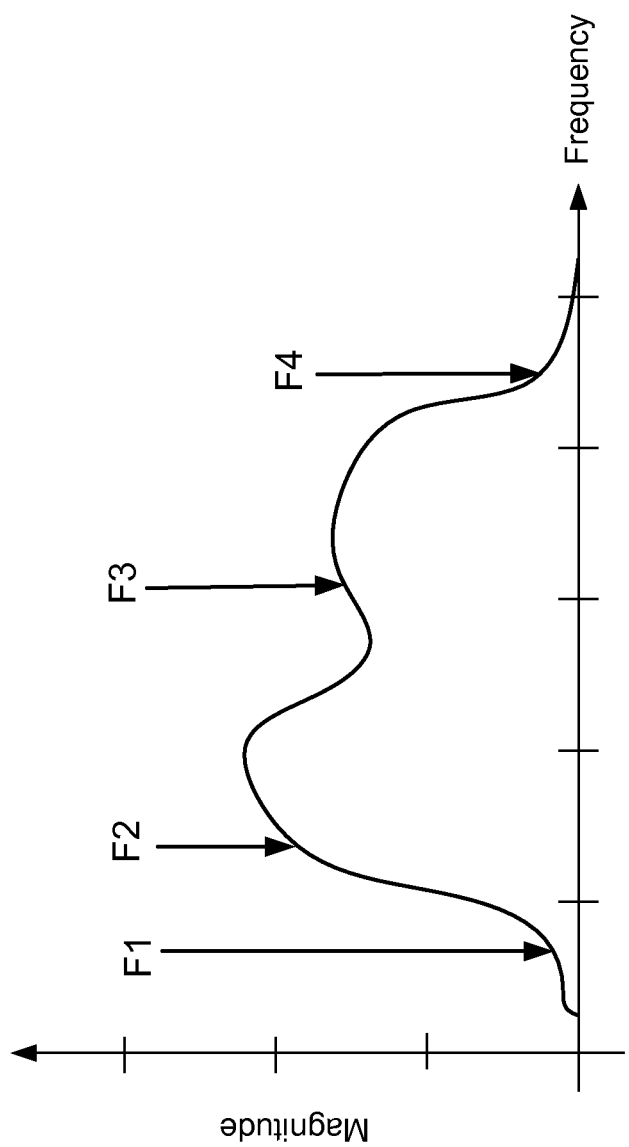

For example, an optical output (710) may have a spectral content as shown in FIG. 7C. The spectral separator (125) may disperse the spectral content of the optical output (710) over the spread distance (712) as shown in FIG. 7B. Thus, the magnitude of the optical output (710) at frequency F1 of FIG. 7C may be dispersed to location L1 of FIG. 7B, the magnitude of the optical output (710) at frequency F2 of FIG. 7C may be dispersed to location L2 of FIG. 7B, the magnitude of the optical output (710) at frequency F3 of FIG. 7C may be dispersed to location L3 of FIG. 7B, and the magnitude of the optical output (710) at frequency F4 of FIG. 7C may be dispersed to location L4 of FIG. 7B.

In one or more embodiments of the disclosure, the spread distance of each spread spectrum spot may be dynamically adjusted by the spectral separator (125). In one or more embodiments of the disclosure, the spectral separator (125) may include multiple refractive or refractive elements that are interchanged based on a desired spread distance. For example, the spectral separator (125) may include a number of refractive or diffractive elements such as prisms or diffractive gratings. Each refractive or diffractive element may generate a different spread distance of each spread spectrum spot at a focal plane. For example, the spectral separator (125) may include a first refractive element that generates spread spectrum spots having a spread distance of 0.1 mm, a second refractive element that generates spread spectrum spots having a spread distance of 0.2 mm, and a third refractive element that generates spread spectrum spots having a spread distance of 0.3 mm at the focal plane. In one or more embodiments of the disclosure, the spectral separator (125) may include mechanical unit (not shown) that may insert a different refractive element or diffractive element into the optical pipeline in response to a message from the controller (140, FIG. 1). By inserting different refractive or diffractive elements that generate sets of spread spectrum spots having different spread distances, the spectral separator (125) may dynamically adjust the spread distance of the generated spread spectrum spots.

In one or more embodiments of the disclosure, the spectral separator (125) may include an adjustable refractive element or an adjustable dispersive element that generates spread spectrum spots having a spread distance corresponding to the adjustability of the refractive element or dispersive element. For example, the spectral separator (125) may be a mechanically adjustable prism, a liquid prism, a liquid crystal grating, or any other adjustable diffractive or dispersive element as would be known to one of ordinary skill in the art. The aforementioned element may be adjusted to change a spread distance of the spread spectrum spots. By adjusting the adjustable refractive or dispersive element, the spectral separator (125) may dynamically adjust the spread distance of the generated spread spectrum spots.

Figure 7D:
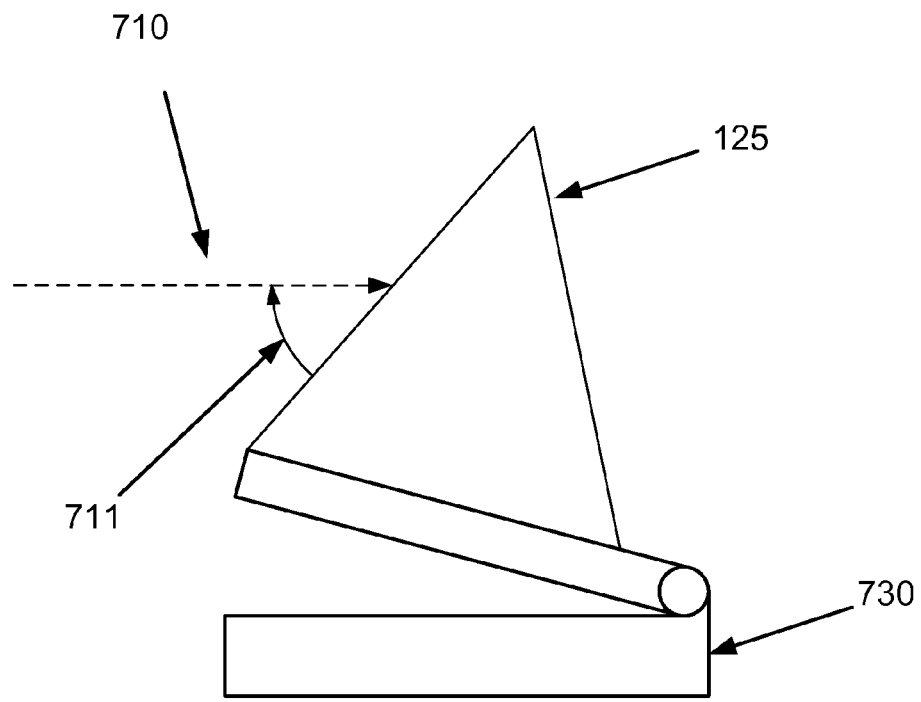
Figure 7E:
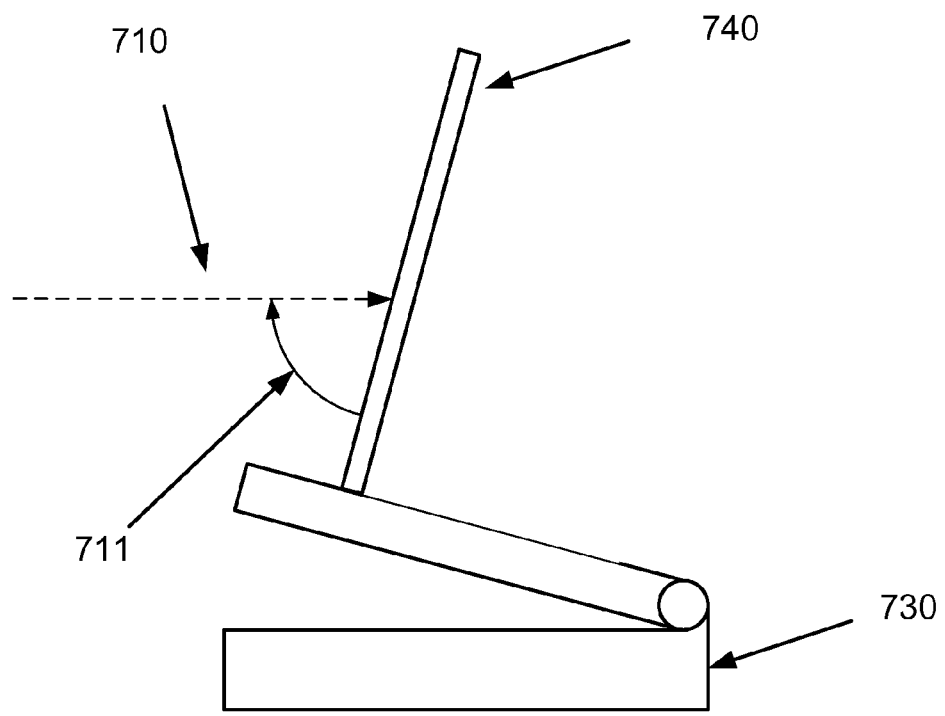

FIGS. 7D and 7E show additional methods in accordance with one or more embodiments of the disclosure that may dynamically adjust the spread length of the spread spectrum spots.

FIG. 7D shows a spectral separator (125) mounted to a dual rotation positioning stage (730) in accordance with one or more embodiments of the disclosure. The incidence angle (711) of the optical output (710) may be dynamically adjusted by mounting the spectral separator (125) to a dual rotation positioning stage (730). For example, as the stage is rotated, the angle of incidence (711) may increase or decrease. Changing the incidence angle (711) changes the spread distance (712) of a spread spectrum spot (700). Thus, by changing the incidence angle (711) by a dual rotation stage (730), the spread distance (712) may be adjusted dynamically.

Additionally, rotating a rotary stage of the dual rotation stage (730) may adjust a rotation of the spread spectrum spot (700), which is discussed in greater detail below.

While the dynamic positioning of the spectral separator (125) has been described with respect to a dual rotation stage, any method of dynamically positioning the spectral separator (125) as would be known to one of ordinary skill in the art may be used without departing from the scope of the disclosure.

Further, while the spectral separator (125, FIG. 1) has previously been described by way of example as a prism, any spectral separator that produces a spatially dispersed spectrum as would be known to one of ordinary skill in the art may be used without departing from the scope of the disclosure. For example, FIG. 7E illustrates the use of a diffractive grating (740) as a spectral separator (125).

As discussed above, the spectral separator (125) may generate a number of spread spectrum spots where each spread spectrum spot corresponds to an optical output received from the light processor. In one or more embodiments of the disclosure, the generated spread spectrum spots may be received by an image sensor (135) by way of a third lens (130).

Figure 8B:
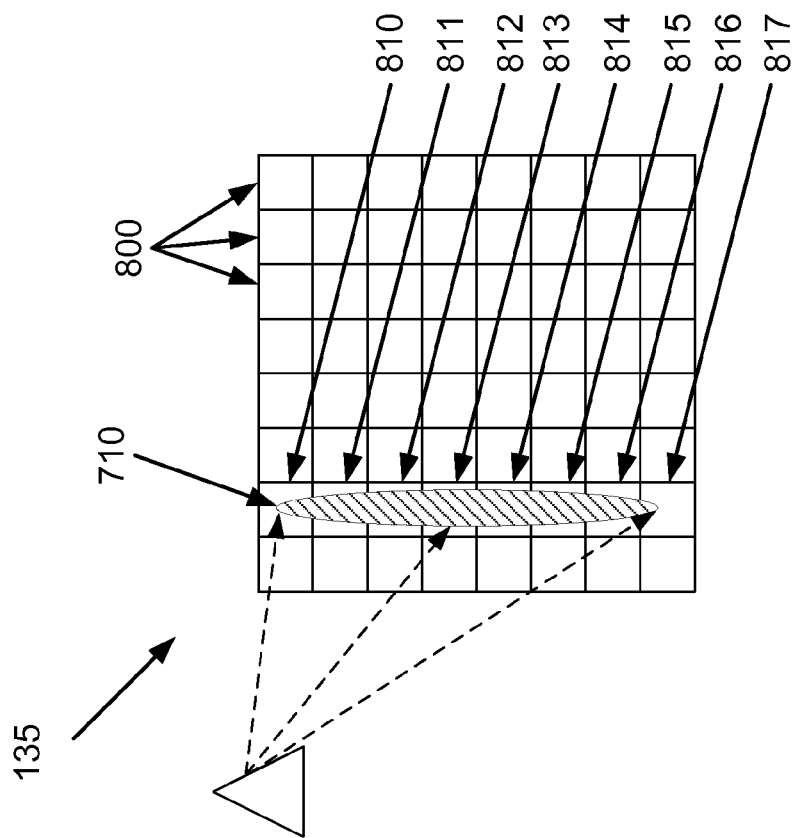
FIGS. 8A-8B show an image sensor in accordance with one or more embodiments of the disclosure.
Figure 8A:
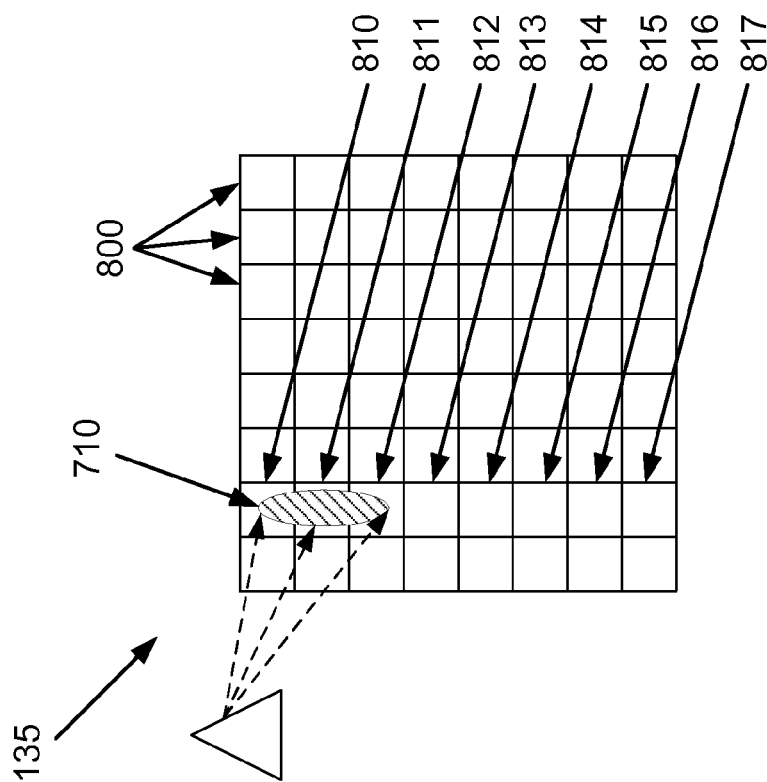

FIGS. 8A and 8B show an example of a spread spectrum spot (710) received by an image sensor (135). The image sensor (135) may include a number of light sensitive elements or pixels (800). The spread spectrum spot (710) may be received by a portion of the pixel (800). As discussed above, the spectral content of the spread spectrum spot (710) is distributed across the spread distance (712). Thus, each pixel of the portion of the pixels (800) that receives the spread spectrum spot (710) receives only a portion of the spectral content of the spread spectrum spot.

FIG. 8A shows an example of a spread spectrum spot (710) having a first spread distance. As seen from FIG. 8A, the first spread distance is approximately three pixels in lengths and thus the spectral content of the spread spectrum is distributed across the three pixels. For example, the spread spectrum spot (710) may have a spectral content that ranges from 400 THz to 800 THz. Each pixel of the three pixels may receive approximately ⅓ of the spectral content, e.g., the first pixel may receive the portion of the spread spectrum spot (710) having a spectral content of 400 THz to 533 THz, the second pixel may receive the portion of the spread spectrum spot (710) having a spectral content of 534 THz to 666 THz, and the third pixel may receive the portion of the spread spectrum spot (710) having a spectral content of 667 THz to 800 THz.

FIG. 8B shows an example of a spread spectrum spot (710) having a second spread distance greater than the first spread distance. As seen from FIG. 8B, the second spread distance is approximately eight pixels in lengths and thus the spectral content of the spread spectrum is distributed into across the eight pixels. For example, the spread spectrum spot (710) may have a spectral content that ranges from 400 THz to 800 THz. Each pixel of the eight pixels may receive approximately ⅛ of the spectral content, e.g. the first pixel may receive the portion of the spread spectrum spot (710) having a spectral content of 400 THz to 450 THz, the second pixel may receive the portion of the spread spectrum spot (710) having a spectral content of 451 THz to 500 THz, etc.

Thus, by varying the spread distance of a spread spectrum spot (710), the spectral content of the spread spectrum spot (710) is distributed across a number of pixels corresponding to the spread length. The number of pixels corresponding to the spread length depends on the spread distance of the spread spectrum spot (710).

Each pixel of the image sensory (135) may generate a voltage corresponding to the quantity of electromagnetic radiation received by the pixel. By knowing the distribution of the spectral content of each spread spectrum spot (710), the quantity of electromagnetic radiation associated with a spectral range of each optical output may be determined. Accordingly, by adjusting the spread distance of a spread spectrum spot (710) the granularity of the spectral range may be adjusted, as described above.

Thus, by adjusting the spacing between each output harness of the light processor (115, FIG. 1) and the incidence angle of each optical output of the light processor (115, FIG. 1) received by the spectral separator (125, FIG. 1), the spatial resolution and spectral resolution of the multidimensional imaging system (100, FIG. 1) may be adjusted. Decreasing the spacing between each output harness may increase the spatial resolution and increasing the spread length of each spread spectrum spot may increase the spectral resolution.

With reference to FIG. 1, it may not be possible to predict which pixels of the image sensor (135) may receive each spread spectrum spot generated by the spectral separator (125, FIG. 1), due to manufacturing tolerances among other causes. Thus, a hyperspectral map may be used to determine the relationship between electrical signals generated by the image sensor (135) and a to-be-generated hyperspectral snapshot.

A hyperspectral snapshot is a spatial and spectral mapping of electromagnetic radiation generated at a single point in time. A hyperspectral snapshot is similar to a picture in that it includes spatial information, e.g. an arrangement of pixels. A hyperspectral snapshot differs from a picture in that rather than having a pixel color, each pixel of the hyperspectral snapshot only includes a quantity of received electromagnetic radiation.

A hyperspectral snapshot may include a number of data elements. Each data element may include pixel coordinates, e.g. (0,0), and a quantity of received electromagnetic energy. The pixel coordinates correspond to the optical outputs generated by the light processor (115, FIG. 2). In other words, each data element of the hyperspectral snapshot may be represented as (spatial_coordinate_A_of_optical_output_N, spatial_coordinate_B_of_optical_output_N, quantity_of_received_radiation_by_pixel) where N is the number of the optical output generated by the light processor (115, FIG. 2).

Each electrical signal generated by each pixel of the image sensor generates a data element of the hyperspectral image. Because the optical outputs of the light processor (115, FIG. 1) are converted into spread spectrum spots by the spectral separator (125, FIG. 1) that are spread across a number of pixels of the image sensor (135, FIG. 1), electrical signals generated by multiple pixels may correspond to each optical output. The electrical signals generated by each pixel of the multiple pixel corresponds to a portion of the spectral content of the optical output. Thus, each pixel receiving a portion of the spread spectrum spot generates a data element corresponding to a portion of the spectral content of the optical output that generates the spread spectrum spot.

A hyperspectral map relates how electrical signals generated by each pixel of the image sensor (135) relates to a hyperspectral snapshot when the light processor (115) and spectral separator (125) have been adjusted to a particular setting. When a light processor (115, FIG. 1) or spectral separator (125) is adjusted, the pixels receiving each spread spectrum spot may change. For example, as shown in FIG. 8A, a spread spectrum spot (710) may be spread over a first pixel (810), second pixel (811), and third pixel (812) for a first set of settings of the light processor (115, FIG. 1) and spectral separator (125). If the settings of the light processor (115, FIG. 1) or spectral separator (125) change, the spread spectrum spot (710) may be spread over a first pixel (810) through an eight pixel (817). The hyperspectral map may relate how optical outputs of the light processor (115, FIG. 1) map to each pixel of the image sensor (135, FIG. 1). Thus, when the light processor (115, FIG. 1) or spectral separator (125, FIG. 1) is adjusted, the hyperspectral map may be updated so that electrical signals generated by the pixels of the image sensor (135) may be used to generate a hyperspectral snapshot.

A hyperspectral map may take as input, for example, an output spacing of the light processor (115, FIG. 1), an incidence angle of the spectral separator (125, FIG. 1), and a pixel number of the image sensor (135). Based on these parameters, the hyperspectral map may determine the spatial position of the to-be-generated hyperspectral snapshot associated with the input pixel and the spectrum range associated with the voltage signals generated by the pixel. Thus, the hyperspectral map may be used to generate a hyperspectral snapshot from the voltage signals produced by the image sensor (135).

In one or more embodiments of the disclosure, the hyperspectral map may be generated by a calibration processes. For example, for each combination of output spacing and angle of incidence of the spectral separator, light of a predetermined spectral content may be radiated into each first end (201, FIG. 3) of the optical fibers (200, FIG. 3), sequentially. By doing so, a spread spectrum spot corresponding to a spatial and spectral content may be generated. The pixels of the image sensor (135, FIG. 1) that produce voltage signals when exposed to the spread spectrum spot may then be determined as corresponding to that stimulation. Based on the determined correspondence, a portion of the hyperspectral map may be generated. The process may then be repeated for each first end to generate a complete hyperspectral map.

Figure 9:
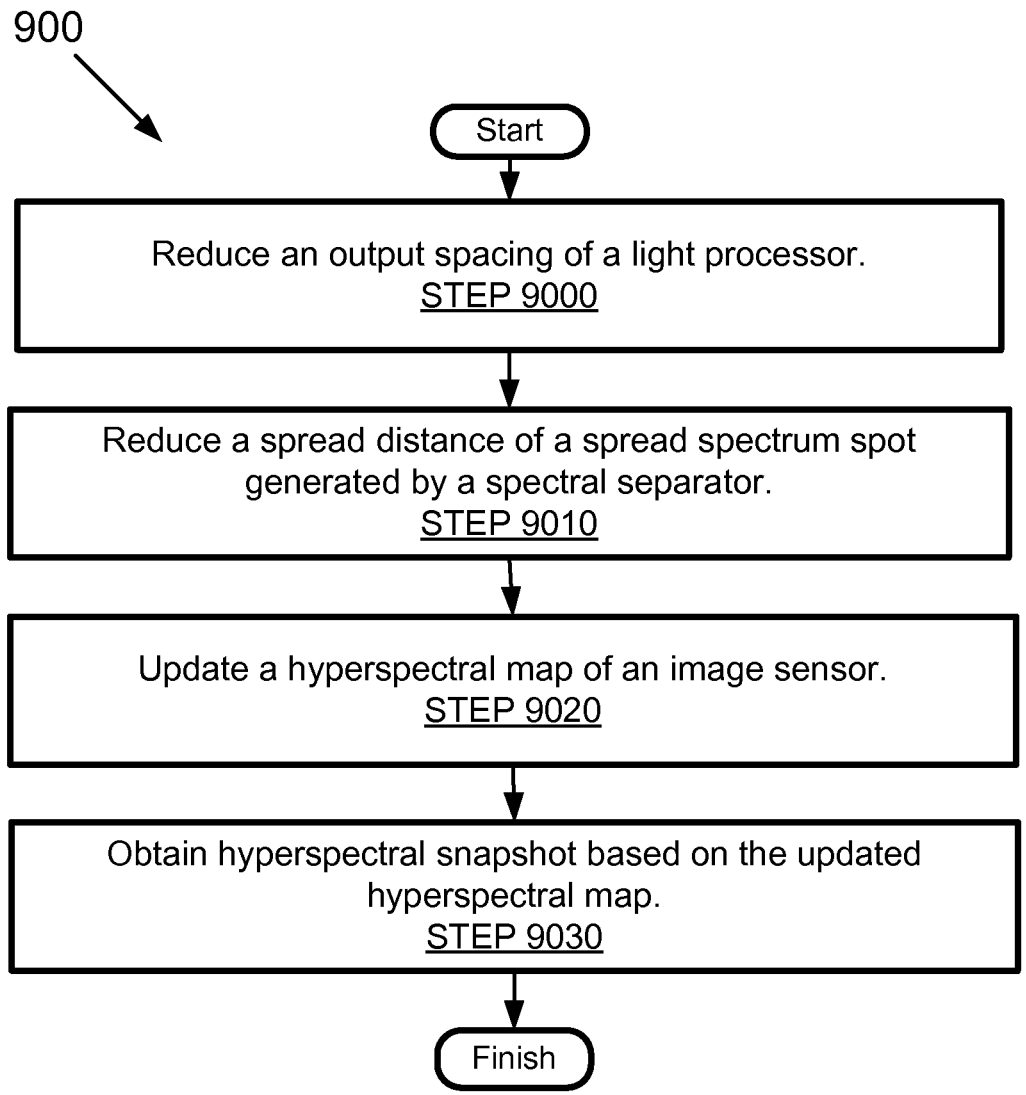
FIG. 9 show a method of adjusting a resolution in accordance with one or more embodiments of the disclosure.

FIG. 9 shows a flowchart (900) according to one or more embodiments of the disclosure. The method depicted in FIG. 9 may be used to increase a spatial resolution of the multidimensional imaging system in accordance with one or more embodiments of the invention. One or more steps shown in FIG. 9 may be omitted, repeated, and/or performed in a different order among different embodiments.

At Step 9000, an output spacing of a light processor is reduced. For example, the controller (140) may send a message to the light processor (115) indicating that the output spacing is to be reduced to a value. In response to the message, the light processor (115) may reduce the output spacing. By reducing the output spacing, the optical outputs of the light processor are more tightly spaced and thus spread spectrum spots are generated more closely together on the image sensor (135). By increasing the density of spread spectrum spots on the image sensor, the spatial resolution of the multidimensional image sensor may be increased.

At Step 9010, a spread distance of a spread spectrum spot generated by a spectral separator may be reduced. For example, the controller (140) may send a message to the spectral separator (125) indicating that a different refractive or dispersive element is to be interchanged with an already present refractive or dispersive element in the optical pipeline. In response to the message, the spectral separator (125) may insert a different refractive or dispersive element into the optical pipeline. By inserting a different refractive or dispersive element into the optical pipeline, the spread distance of each spread spectrum spot on the image sensor (135) may be reduced. By reducing the spread distance, spread spectrum spots may be more densely packed on the image sensor (135) without overlapping.

In another example, the controller (140) may send a message to the spectral separator (125) indicating that an adjustable refractive element or adjustable diffractive element is to be adjusted. In response to the message, the spectral separator (125) may adjust the adjustable refractive element or adjustable diffractive element. By adjusting the adjustable refractive element or adjustable diffractive element, the spread distance of each spread spectrum spot on the image sensor (135) may be reduced. By reducing the spread distance, spread spectrum spots may be more densely packed on the image sensor (135) without overlapping.

At Step 9020, a hyperspectral map of the image sensor is updated. For example, the controller (140) may store a number of hyperspectral maps of the image sensor. Each hyperspectral map may be used to determine a hyperspectral snapshot for an output spacing and refractive or dispersive element of the spectral separator. The controller (140) may update the hyperspectral map by selecting a hyperspectral map corresponding to the output spacing and refractive or dispersive element of the spectral separator set in Step 9000 and Step 9010, respectively.

At Step 9030, a hyperspectral snapshot is obtained based on the updated hyperspectral map. For example, light may be received by the multidimensional imaging system from a target. The image sensor may generate voltage signals based on the received light. The updated hyperspectral map may be used to generate a hyperspectral snapshot based on the generated voltage signals as described above.

Figure 10:
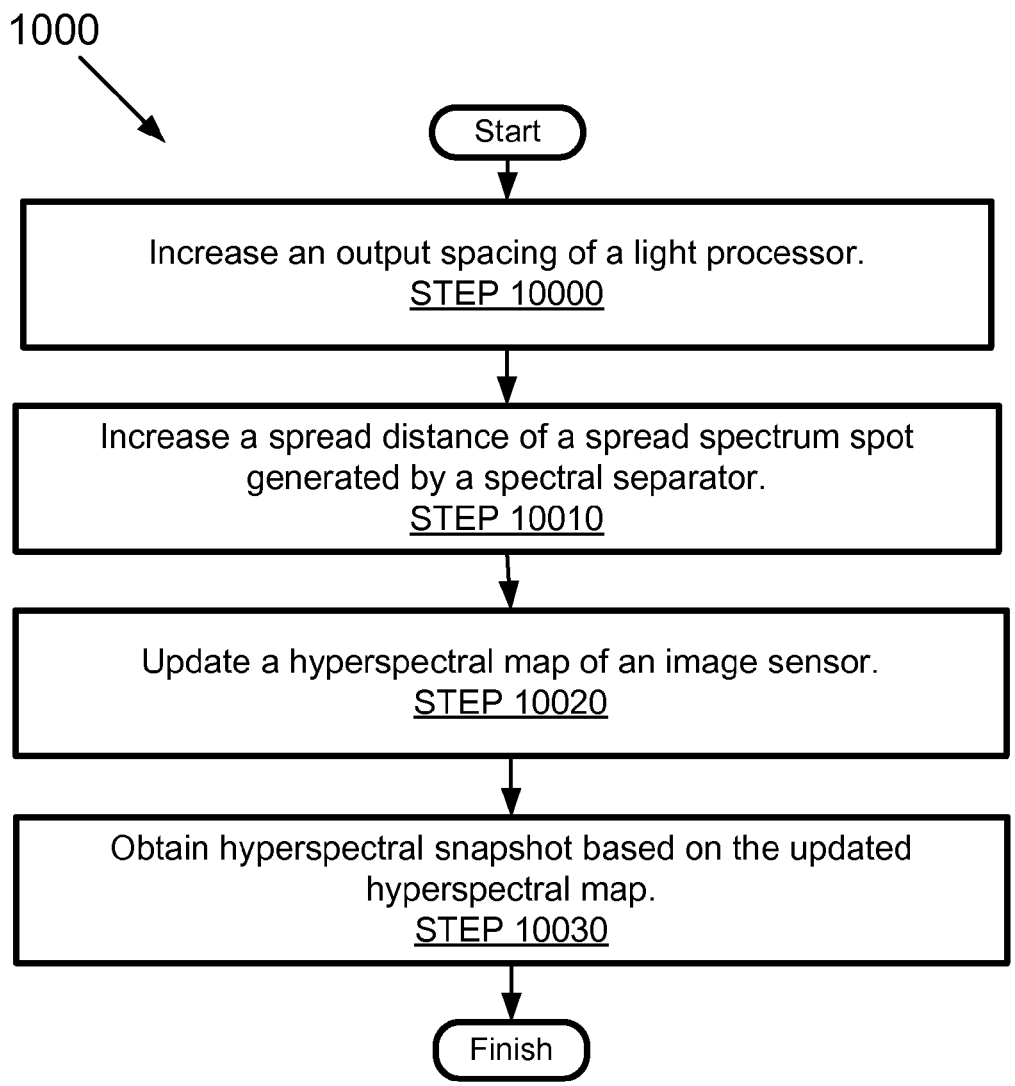
FIG. 10 show a method of adjusting a resolution in accordance with one or more embodiments of the disclosure.

FIG. 10 shows a flowchart (1000) according to one or more embodiments of the disclosure. The method depicted in FIG. 10 may be used to increase a spectral resolution of the multidimensional imaging system in accordance with one or more embodiments of the invention. One or more steps shown in FIG. 10 may be omitted, repeated, and/or performed in a different order among different embodiments.

At Step 10000, an output spacing of a light processor is increased. For example, the controller (140) may send a message to the light processor (115) indicating that the output spacing is to be increased to a value. In response to the message, the light processor (115) may increase the output spacing. By increasing the output spacing, optical outputs of the light processor are less densely spaced and thus spread spectrum spots are generated more widely spaced on the image sensor (135). By decreasing the density of spread spectrum spots on the image sensor, the additional pixels on the image sensor may be used to increasing the spectral resolution without causing the spread spectrum spots to overlap.

At Step (10010), a spread distance of a spread spectrum spot generated by a spectral separator may be increased. For example, the controller (140) may send a message to the spectral separator (125) indicating that a different refractive or dispersive element is to be interchanged with an already present refractive or dispersive element in the optical pipeline. In response to the message, the spectral separator (125) may insert a different refractive or dispersive element into the optical pipeline. By inserting a different refractive or dispersive element into the optical pipeline, the spread distance of each spread spectrum spot on the image sensor (135) may be increased. By increasing the spread distance, the spread spectrum spots may be distributed over a larger number of pixels of the image sensor (135).

In another example, the controller (140) may send a message to the spectral separator (125) indicating that an adjustable refractive element or adjustable diffractive element is to be adjusted. In response to the message, the spectral separator (125) may adjust the adjustable refractive element or adjustable diffractive element. By adjusting the adjustable refractive element or adjustable diffractive element, the spread distance of each spread spectrum spot on the image sensor (135) may be increased. By increasing the spread distance, the spread spectrum spots may be distributed over a larger number of pixels of the image sensor (135).

At Step (10020), a hyperspectral map of the image sensor is updated. For example, the controller (140) may store a number of hyperspectral maps of the image sensor. Each hyperspectral map may be used to determine a hyperspectral snapshot for an output harness spacing and refractive or dispersive element of the spectral separator. The controller (140) may update the hyperspectral map by selecting a hyperspectral map corresponding to the output spacing and refractive or dispersive element of the spectral separator set in Step 10000 and Step 10010, respectively.

At Step (10030), a hyperspectral snapshot is obtained based on the updated hyperspectral map. For example, light may be received by the multidimensional imaging system from a target. The image sensor may generate voltage signals based on the received light. The updated hyperspectral map may be used to generate a hyperspectral snapshot based on the generated voltage signals as described above.

Thus, the methods of FIGS. 9 and 10 may change a spatial resolution or a spectral resolution of a multidimensional imaging system. To further clarify the operation of the multidimensional imaging system, FIGS. 11A-11D illustrate optical mappings of a real image received by the light processor (115, FIG. 1) to the spread spectrum spots received by the image sensory (135, FIG. 1).

Figure 11A:
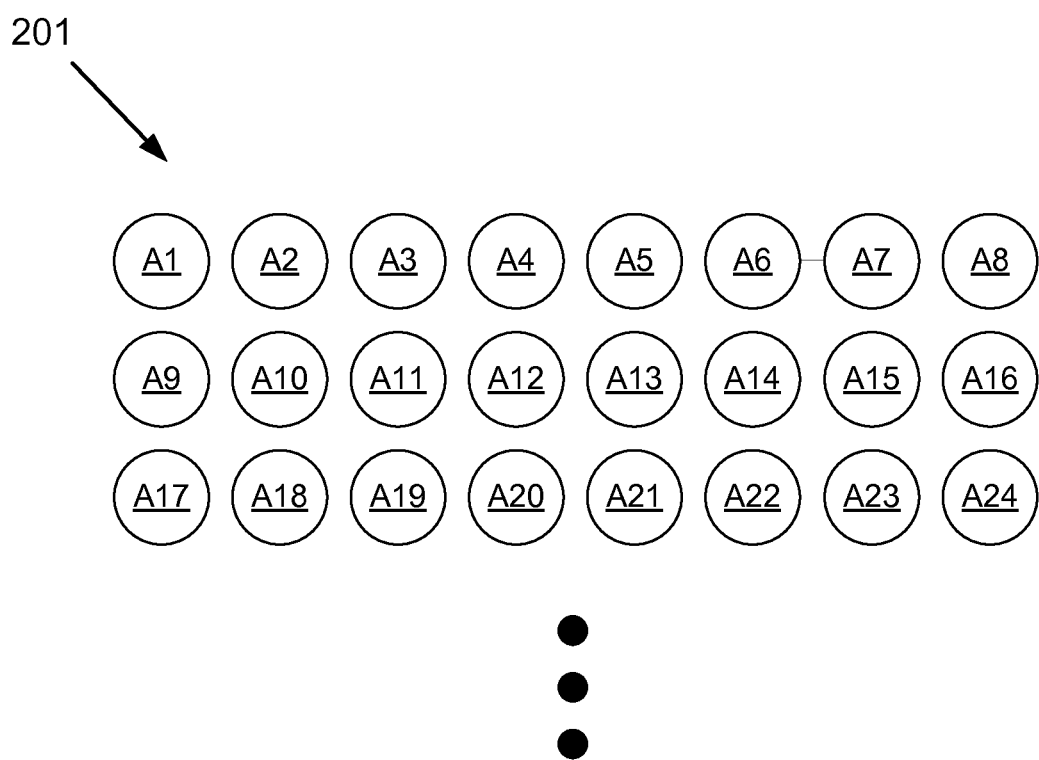
FIGS. 11A-11E show a mapping of an input of a light processor to spread spectrum spots received by an image sensor in accordance with one or more embodiments of the disclosure.
Figure 11B:
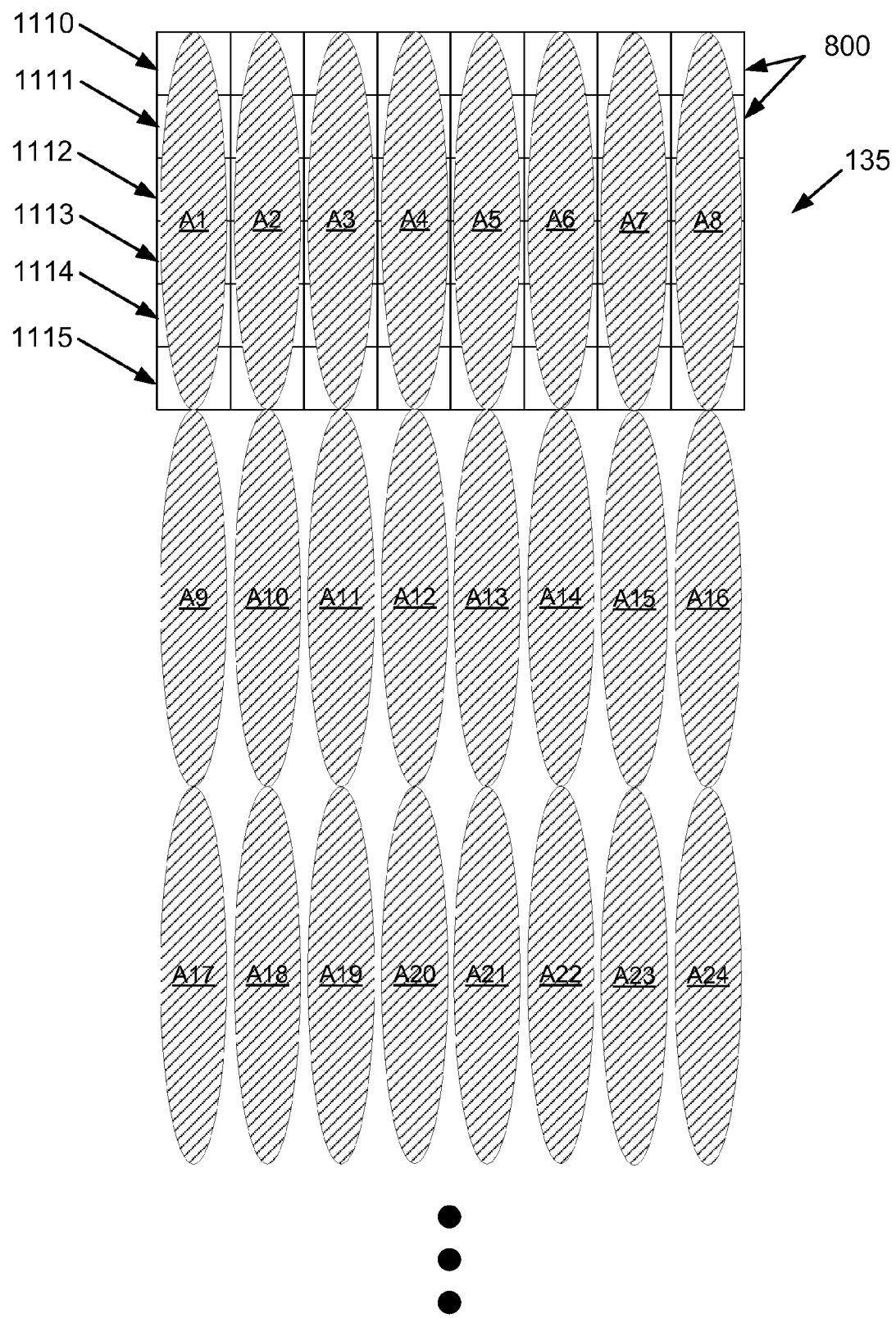
Figure 11C:
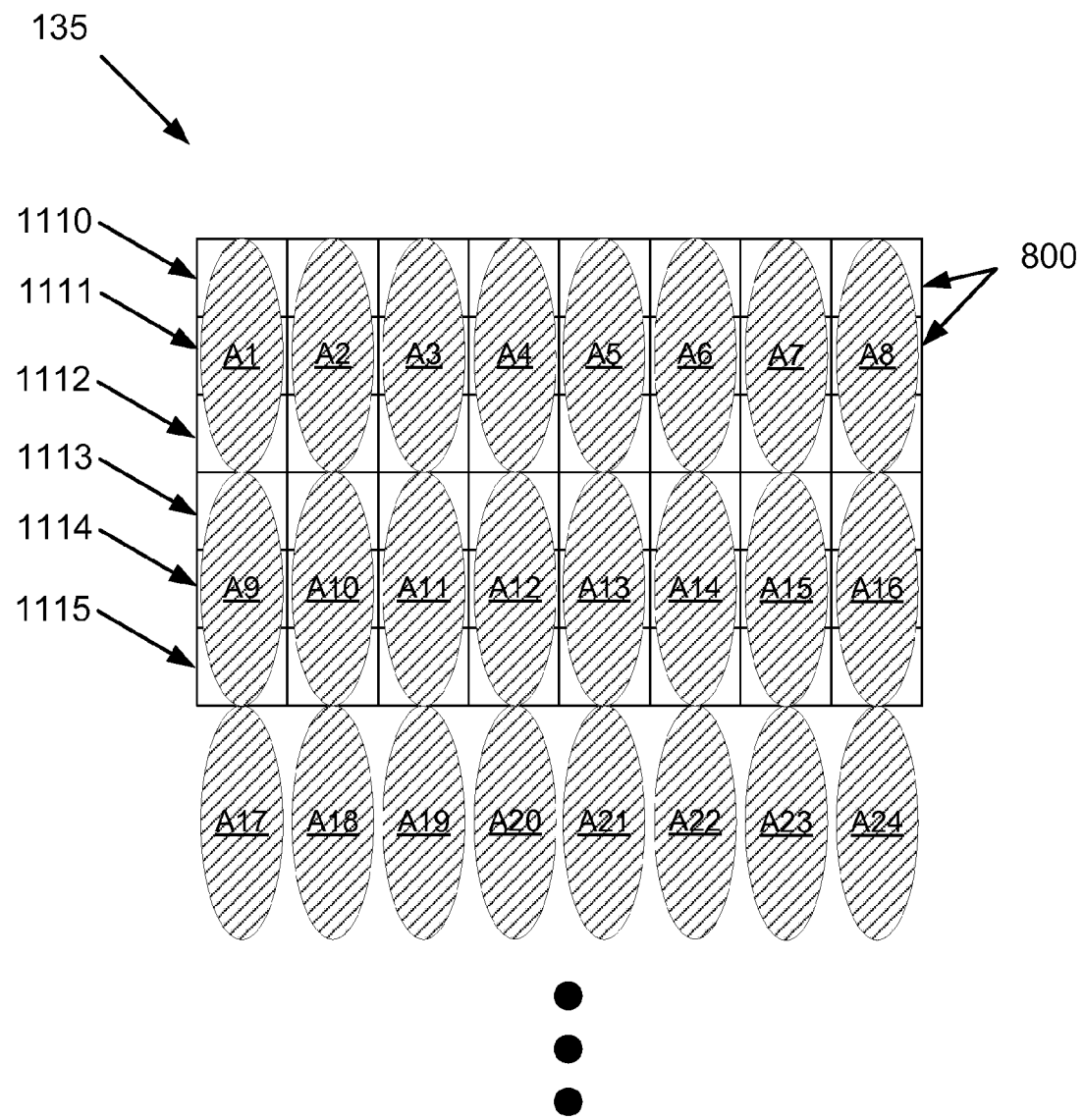

FIGS. 11A-11C show an illustration of the optical relationship between the real image received by the light processor (115) and the corresponding spread spectrum spots on the image sensor (135) in accordance with one or more embodiments of the disclosure. As seen in FIG. 11A, each of the first ends (201) of the optical fibers (200, FIG. 2) has been labeled as A1, A2, A3, etc. When a real image is projected onto the first ends (201), a portion of the real image is received by each of the first ends (201). Each received portion is output as an optical output to the spectral separator (125), as discussed above, which generates a number of spread spectrum spots on the image sensor (135) corresponding to the optical outputs.

FIG. 11B shows a set of spread spectrum spots labeled as A1-A24 on the image sensor (135) resulting from projecting a real image onto the optical inputs of FIG. 11A. Each labeled spread spectrum spot shown in FIG. 11B is generated in response to each labeled first end of the optical fibers (200, FIG. 2) receiving a portion of the real image. In other words, FIG. 11B illustrates the spread spectrum spots generated in response to each first end of FIG. 11A receiving a portion of a real image.

The spread length of the spread spectrum spots has been set to the total length of the image sensory to enhance the spectral resolution of a spectral snapshot. As seen from FIG. 11B, the spread length of the spread spectrum spots is proportional to the total size of the image sensor (135). By setting the spread length to the total size of the image sensor (135), each spread spectrum spot is distributed across the maximum number of pixels. By distributing each spread spectrum spot across the maximum number of pixels, the spectral content of the spread spectrum spot is divided across the maximum number of pixels. Thus, by maximizing the division of the spectral content of each spread spectrum spot, the spectral range of the spectral content of each spread spectrum spot is minimized.

Said another way, embodiments of the disclosure permit the user to "zoom" into a particular portion of the hyperspectral snapshot to obtain more granular information about the specific sections of the hyperspectral snapshot. For example, FIG. 11C shows a first spread spectrum spot (A1) that is spread over a first pixel (1110), second pixel (1111), and third pixel (1112). By dividing the first spread spectrum spot (A1) over three pixels, the spectral content of the first spread spectrum spot (A) may be divided into three bin. FIG. 11C shows also shows a second spread spectrum spot (A9) that is spread over a fourth pixel (1113), fifth pixel (1114), and sixth pixel (1115). Embodiments of the disclosure enable a user to "zoom" by dynamically repurposing pixels of the image sensor (135) from spatial resolution to spectral resolution and vise versa. A user may adjust the light processor (115, FIG. 1) and spectral separator (125, FIG. 1) to produce the spread spectrum spots shown in FIG. 11B. FIG. 11B shows a first spread spectrum spot (A1) that is spread over a first pixel (1110), second pixel (1111), third pixel (1112), fourth pixel (1113), fifth pixel (1114), and sixth pixel (1115). By dividing the first spread spectrum spot (A1) over six pixels, the spectral content of the first spread spectrum spot (A1) may be divided into six bin. Thus, the fourth pixel (1113), fifth pixel (1114), and sixth pixel (1115) have been dynamically repurposed to enhance the spectral resolution of the optical input associated with the first spread spectrum spot (A1). Similarly to "zooming" spectral resolution, embodiments of the disclosure may enable "zooming" spatial resolution by dynamically repurposing pixels from spectral resolution to spatial resolution.

FIG. 11C shows a second resulting set of spread spectrum spots labeled as A1-A24 on the image sensor (135). In comparison to FIG. 11B, the spread length of each spread spectrum spot has been reduced. By reducing the spread length of each spread spectrum spot, a greater number of spread spectrum spots may be received by the image sensor (135). For example, as seen in FIG. 11C, the spread length has been reduced to allow two spread spectrum spots to be received by the image sensory (135) in a vertical direction. By increasing the number of spread spectrum spots received by the image sensor (135), the spatial resolution of the multidimensional imaging system (100) is increased.

In one or more embodiments of the disclosure, the spectral separator (125, FIG. 1) may be rotated in multiple dimensions. With reference to FIG. 7D, the spectral separator (125) may be mounted on a dual rotation stage (730). In addition to rotating the spectral separator (125) to change the angle of incidence (711) of received light, the spectral separator (125) may be rotated by a second rotation stage (not shown). For example, the dual rotation stage (730) as illustrated in FIG. 7D may be mounted on a rotation stage that changes a second angle of incidence of light received by the spectral separator (125). As illustrated in FIG. 7D, the portion (710) impinges the spectral separator (125) at normal incidence, e.g. 90°, along the axis into or out of the page. By rotating the dual rotation stage (730) by the second rotation stage (not shown), the second angle of incidence of light received by the spectral separator (125) diverges from normal incidence. When the send angle of incidence diverges from normal, the spectral separator (125) generates a spread spectrum spots that are rotated with respect to optical axis of the multidimensional imaging system (100, FIG. 1).

Figure 11D:
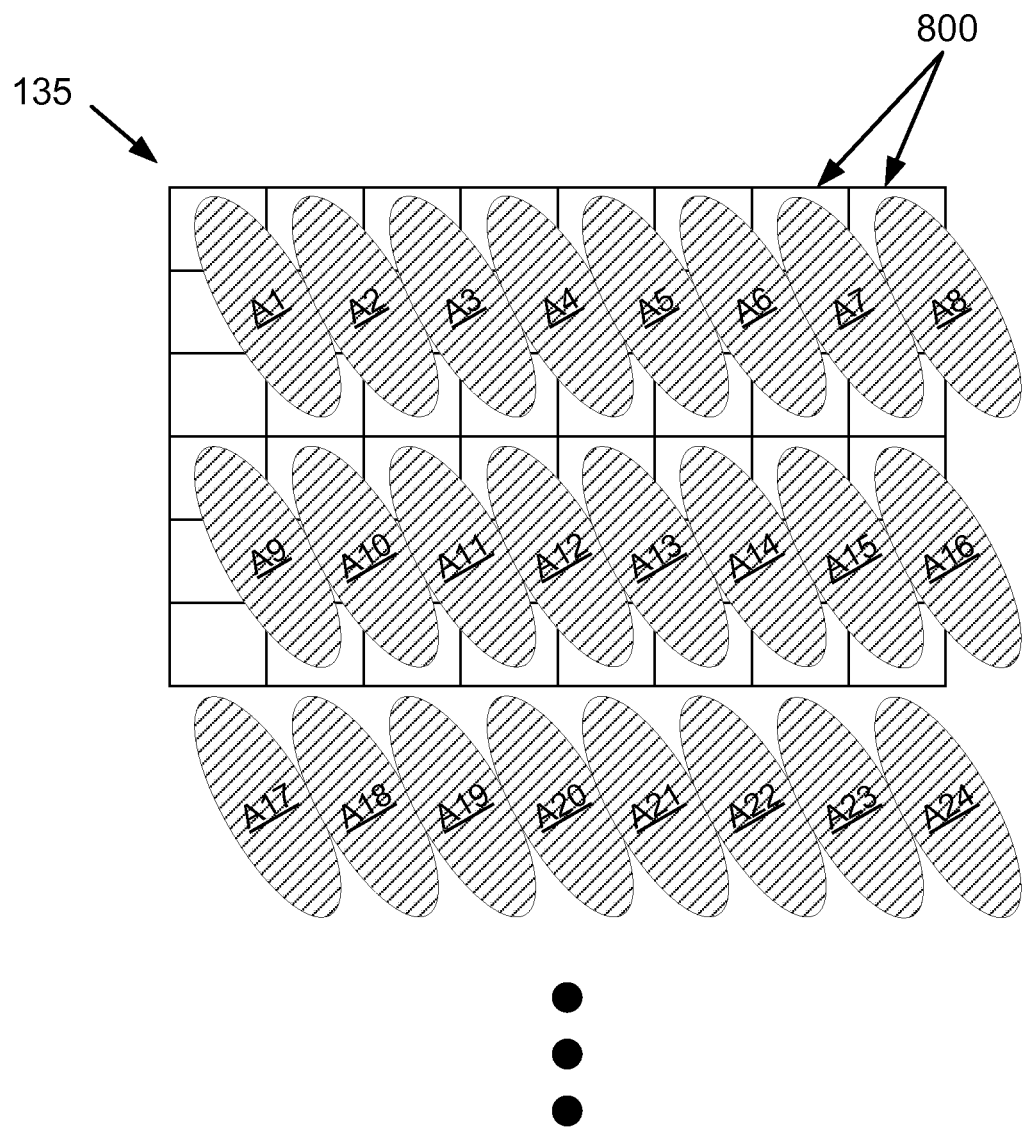

FIG. 11D shows an example of a set of spread spectrum spots labeled as A1-A24 on the image sensor (135) that result when the second angle of incidence is not normal, e.g. not 90°. As seen from FIG. 11D, when the second angle of incidence is not normal, the generated spread spectrum spots are rotated. In one or more embodiments of the disclosure, rotating the spread spectrum spots (A1-A24) may be used to verify a generated hyperspectral snapshot.

For example, a first hyperspectral snapshot may be generated with a second angle of incidence of normal incidence. The multidimensional imaging system may change the second angle of incidence to a non-normal value, e.g. 60°. Changing the second angle of incidence may rotate the spread spectrum spots (A1-A24). By rotating the spread spectrum spots (A1-A24), the spread spectrum spots (A1-A24) may be received by different pixels (800) when compared to the pixels (800) that received the spread spectrum spots (A1-A24) when the second angle of incidence was normal incidence. A second hyperspectral snapshot may be generated while the second angle of incidence is not normal. The two hyperspectral snapshots may then be compared. By comparing the two hyperspectral snapshots, differences between the two hyperspectral snapshots may be identified. By identifying the differences, a validity of each hyperspectral snapshot may be determined. The process may be repeated for a number of second angles of incidence to further verify each hyperspectral snapshot. A composite hyperspectral snapshot may be generated by averaging each corresponding pixel of each hyperspectral snapshot. Generating a composite hyperspectral snapshot may increase the accuracy of a generated hyperspectral snapshot by reducing the impact of defective pixels.

Figure 11E:
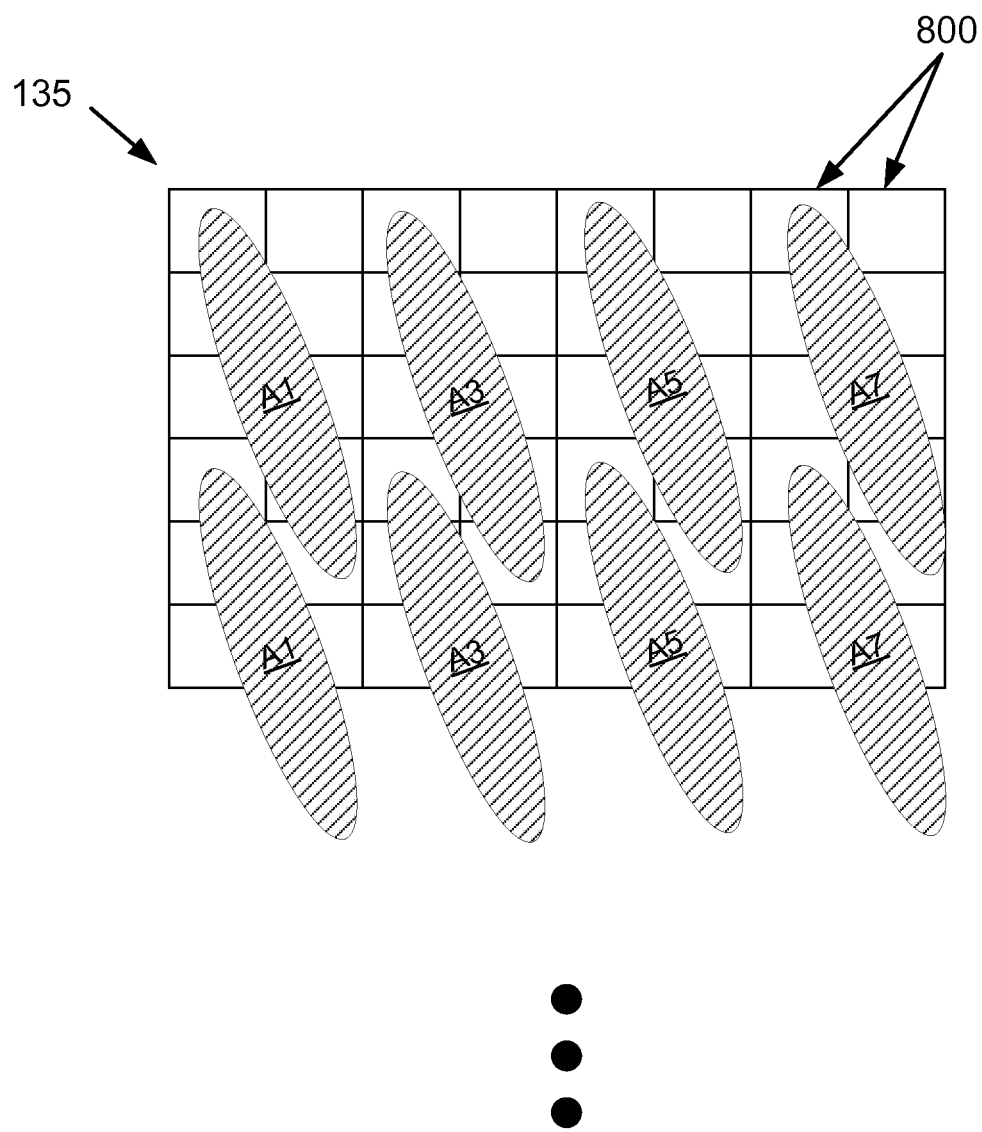

In one or more embodiments of the disclosure, rotating the spread spectrum spots (A1-A24) may be used to arrange spread spectrum spots on an image sensor (135). For example, in one or more embodiments of the disclosure, the pixel density in a horizontal direction may be greater than the density of generated spread spectrum spots. By rotating the spread spectrum spots, as shown in FIG. 11E, the pixels in a horizontal direction of the image sensor (135) may be more efficiently used, e.g. when the spread spectrum spots are not rotated some pixels are not illuminated.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method of adjusting a resolution of a multidimensional imaging system, comprising:
adjusting an output spacing of a plurality of optical fibers of a light processor, of the multidimensional imaging system, to a first spacing, wherein the light processor comprises the plurality of optical fibers having a first end with an input spacing, wherein the output spacing is dynamically adjustable;
taking a first hyperspectral snapshot while the output spacing is set to the first spacing;
adjusting the output spacing of the light processor to a second spacing;
taking a second hyperspectral snapshot while the output spacing is set to the second spacing; and
performing one selected from a group consisting of identifying a difference between the first hyperspectral snapshot and the second hyperspectral snapshot, verifying the first hyperspectral snap shot based on the second hyperspectral snapshot, and generating a composite hyperspectral snap shot based on the first hyperspectral snapshot and the second hyperspectral snapshot, wherein the output spacing specifies a distance between a second end of a first fiber of the plurality of optical fibers and a second end of a second fiber of the plurality of optical fibers.

2. The method of claim 1, further comprising:
prior to taking the second hyperspectral snap shot, adjusting an adjustable spread distance of a spectral separator of the multidimensional imaging system based on the new output spacing.

3. The method of claim 1, wherein taking a first hyperspectral snapshot comprises:
receiving light from a target;
generating a plurality of optical outputs, by the light processor, based on the received light;
generating a plurality of spread spectrum spots, by a spectral separator, based on the plurality of optical outputs;
generating a plurality of electrical signals, by an image sensor of the multidimensional imaging system, based on the plurality of spread spectrum spots; and
generating a hyperspectral snapshot based on the plurality of electrical signals.

4. The method of claim 3, wherein the light received by the light processor forms a real image at an input of the light processor.

5. The method of claim 3, wherein each generated spread spectrum spot of the plurality of spread spectrum spots has a spectral content corresponding to a spectral content of a portion of the real image.

6. The method of claim 3, wherein each generated spread spectrum spot is spatially separated from each other spread spectrum spot of the plurality of spread spectrum spots by a distance corresponding to the adjustable output spacing in a first linear dimension.

7. The method of claim 6, wherein the hyperspectral map relates the generated plurality of electrical signals to a plurality of data elements of the second hyperspectral snapshot,
wherein each data element of the plurality of data elements comprises a spectral content associated with an optical output.

8. The method of claim 6, wherein each generated spread spectrum spot is spatially separated from each other spread spectrum spot of the plurality of spread spectrum spots by a second distance corresponding to the input spacing in a second linear dimension.

9. The method of claim 2, wherein adjusting the adjustable spread distance of the spectral separator changes the spread distance of each spread spectrum spot of the plurality of spread spectrum spots.

10. The method of claim 2, further comprising:
updating a hyperspectral map of the image sensor based on the adjusted spread distance and the new output spacing.

11. A multidimensional imaging system, comprising:
a light processor comprises a plurality of optical fibers having a first end with an input spacing and a second end with an output spacing, wherein the output spacing is dynamically adjustable; and
a spectral separator having an adjustable spread distance and configured to generate a plurality of spread spectrum spots, wherein the output spacing is different than the input spacing and the output spacing specifies a distance between a second end of a first fiber of the plurality of optical fibers and a second end of a second fiber of the plurality of optical fibers,
wherein an input electromagnetic radiation is received by the first end of each of the optical fibers of the plurality of optical fibers,
wherein an output electromagnetic radiation is provided by the second end of each optical fiber of the plurality of optical fibers to a corresponding spread spectrum spot of the plurality of spread spectrum spots.

12. The multidimensional imaging system of claim 11, wherein the light processor is configured to receive a real image and generate a plurality of optical outputs based on the real image.

13. The multidimensional imaging system of claim 12, wherein each optical output of the plurality of optical outputs has a spectral content corresponding to a spectral content of a portion of the real image.

14. The multidimensional imaging system of claim 12, where each optical output of the plurality of optical outputs is spatially separated from each other optical output of the plurality of optical outputs in a first linear dimension by the adjustable output spacing.

15. The multidimensional imaging system of claim 12, where each optical output of the plurality of optical outputs is spatially separated from each other optical output of the plurality of optical outputs in a second linear dimension by the input spacing,
wherein each optical output of the plurality of optical outputs are coplanar.

16. The multidimensional imaging system of claim 11, wherein the spectral separator is configured to:
receive the output electromagnetic radiation;
generate a plurality of spread spectrum spots based on the received output electromagnetic radiation,
wherein each generated spread spectrum spot of the plurality of spread spectrum spots has a spread distance based on the adjustable spread distance of the spectral separator.

17. The multidimensional imaging system of claim 16, wherein adjusting the adjustable spread distance of the spectral separator changes the spread distance.

18. The multidimensional imaging system of claim 11, wherein the multidimensional imaging system further comprises:
an image sensor configured to receive the plurality of spread spectrum spots and generate a plurality of electrical signals,
wherein each electrical signal of the plurality of electrical signals corresponds to a portion of a spectral content of a spread spectrum spot of the plurality of spread spectrum spots,
wherein a hyperspectral snapshot is generated based on the plurality of electrical signals.

19. The multidimensional imaging system of claim 18, wherein the hyperspectral snapshot is generated based on a hyperspectral map of the image sensor corresponding to the adjustable spread distance and the adjustable output spacing.

20. The multidimensional imaging system of claim 19, wherein the hyperspectral map relates the generated plurality of electrical signals to a data element of a hyperspectral snapshot, wherein the data element comprises a spectral content associated with an optical output of the plurality of optical outputs.

* * * * *